(12) United States Patent
Lesniak et al.

(10) Patent No.: US 12,055,352 B2
(45) Date of Patent: Aug. 6, 2024

(54) FAN BRAKE CONTROL SYSTEM

(71) Applicant: Tex Tenn Design and Consulting, Nashville, TN (US)

(72) Inventors: Brian Alexander Lesniak, Nashville, TN (US); Thomas K. Best, Ft. Collins, CO (US); Carl T. Johnson, Ft. Collins, CO (US); Thomas Ray Hendrix, Annona, TX (US); Michael Wayne Sprengel, Ft. Collins, CO (US)

(73) Assignee: Tex Tenn, LLC, Nashville, TN (US)

( * ) Notice: Subject to any disclaimer, the term of this patent is extended or adjusted under 35 U.S.C. 154(b) by 0 days.

(21) Appl. No.: 17/948,609

(22) Filed: Sep. 20, 2022

(65) Prior Publication Data
US 2023/0018836 A1   Jan. 19, 2023

Related U.S. Application Data

(63) Continuation of application No. 17/065,474, filed on Oct. 7, 2020, now Pat. No. 11,454,464, which is a (Continued)

(51) Int. Cl.
| | |
|---|---|
| H02K 7/10 | (2006.01) |
| F04D 25/08 | (2006.01) |
| F04D 27/00 | (2006.01) |
| F28F 27/00 | (2006.01) |
| H02P 3/04 | (2006.01) |
| F16D 55/226 | (2006.01) |
| F16D 65/18 | (2006.01) |
| H02P 6/08 | (2016.01) |

(52) U.S. Cl.
CPC ............ *F28F 27/003* (2013.01); *F04D 25/08* (2013.01); *F04D 27/004* (2013.01); *H02P 3/04* (2013.01); *F16D 55/226* (2013.01); *F16D 65/18* (2013.01); *H02P 6/08* (2013.01)

(58) Field of Classification Search
CPC .... H02P 29/40; H02P 3/04; H02P 6/08; F04D 25/08
See application file for complete search history.

(56) References Cited

U.S. PATENT DOCUMENTS

| | | | |
|---|---|---|---|
| 2016/0238469 A1* | 8/2016 | Gilbert | .............. G01L 3/109 |
| 2020/0076334 A1* | 3/2020 | Lesniak | ............ F16D 65/18 |

FOREIGN PATENT DOCUMENTS

JP   2017067265 A  *  4/2017

* cited by examiner

*Primary Examiner* — Karen Masih
(74) *Attorney, Agent, or Firm* — Bradley Arant Boult Cummings LLP; Blake M. Bernard

(57) ABSTRACT

A fan brake system for controlling an industrial fan system, the fan brake system including a fan brake having a brake pad movable on the fan brake to selectively engage the fan system. An actuator including a motor can be operable to cause the fan brake to perform a braking procedure on the fan system to resist rotational movement of the fan system. A controller can be communicated with the actuator, the controller operable to selectively cause the actuator and the fan brake to perform the braking procedure, wherein the controller is operable to monitor and control power being supplied to the motor of the actuator during the braking procedure to maintain a torque output of the motor according to a predetermined torque profile during the braking procedure.

20 Claims, 16 Drawing Sheets

Related U.S. Application Data continuation-in-part of application No. 16/553,540, filed on Aug. 28, 2019, now Pat. No. 11,303,232.

(60) Provisional application No. 62/911,724, filed on Oct. 7, 2019, provisional application No. 62/724,843, filed on Aug. 30, 2018.

FAN BRAKE CONTROL SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCE TO RELATED APPLICATIONS

This application is a continuation of U.S. patent application Ser. No. 17/065,474 filed Oct. 7, 2020 entitled FAN BRAKE CONTROL SYSTEM which is a continuation in part of U.S. application Ser. No. 16/553,540, filed on Aug. 29, 2019, entitled FAN BRAKE CONTROL SYSTEM, which claims benefit to U.S. Provisional Patent Application No. 62/724,843, filed on Aug. 30, 2018, entitled FAN BRAKE CONTROL SYSTEM, and is a non-provisional of U.S. Provisional Patent Application No. 62/911,724 entitled FAN BRAKE CONTROL SYSTEM, filed Oct. 7, 2019, each of which is incorporated herein by reference in their entireties.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

Evaporative cooling towers are utilized in a myriad of applications globally to provide effective and efficient cooling. These devices provide cooling by bringing ambient air into contact with hot process water. The hot process water will naturally evaporate as it seeks to achieve equilibrium, increasing the moisture content in the air stream and reducing the temperature of the process water.

Cooling begins with the hot process water being pumped to the top of the cooling tower and then discharged into a distribution system. This distribution system spreads the water out across the tower and on top of the fill media. The fill media facilitates cooling by increasing the surface area of the water that is exposed to the air stream and suspending the water temporarily to increase the duration of interaction with the air.

In applications where water is scarce, sometimes an air-cooled condenser can be utilized in lieu of a cooling tower. In air-cooled condensers, the system is constructed with a framework of metal tubes referred to as tube bundles. Steam coming from a facility's process is routed into a steam header that spreads the steam through the tube bundles. Ambient air is then blown over the tube bundles so thermal energy can be transferred from the steam and into the ambient air.

Different from evaporative cooling, the driving force for heat transfer in these applications is the difference in temperature between the steam and the ambient air. As thermal energy is removed, the steam changes states back into water. The condensed water is then routed back to the facility.

Airflow is required for both cooling towers and air-cooled condensers in order for heat rejection to be maximized. Air flow can be generated with the use of a mechanical or industrial fan system. The type of industrial fan system utilized is very similar in both cooling towers and air-cooled condensers.

The industrial fan systems are most often comprised of an electric motor, driveshaft, right angle gearbox or speed reducer, and fan assembly.

There are also applications where the mechanical fan system is comprised of an electric motor and a fan assembly. The fan assembly is mounted directly to a vertical output shaft, utilizing a coupling device and other elements of the typical assembly are reduced or eliminated. In other embodiments, the mechanical fan system can include any number of components, including but not limited to a motor, drive shaft, gear box, drive belt system, pulley system, fan chassis, fan blades, etc.

There are instances where the fan assembly needs to be locked in place to prevent unintended motion of the fan. This is especially true for high-wind and storm events where the ambient conditions can cause the fan to rotate at high speeds while the electric motor is de-energized. In these conditions, the fiberglass fan stacks tend to flex inward and outward. Inevitably, the fan may make contact with the fan stack, causing damage to the assembly and potentially creating airborne hazards such as a fan blade that breaks loose and is thrown from the cooling tower, or a fan stack that is torn from the tower. A need exists to remove and/or minimize this hazard.

The fan can also spin freely while the motor is off during non-storm conditions. This creates a problem for personnel that need to be within the fan stack area for service, inspection, and maintenance work. They are exposed to the potential energy of the fan spinning and this puts them at risk. The fan may rotate unexpectedly while personnel are in the fan stack area and strike them. This could cause serious injury and potentially subject that individual to a fall hazard. A need exists to remove and/or minimize this hazard.

Unfortunately, it is common for some facilities to using improper techniques to isolate the fan's potential energy. Some of these techniques include wedging a 2×4 piece of lumber against the driveshaft to impede movement, or tying rope around parts of the mechanical system. If the 2×4 does not sufficiently stop the equipment, it may be thrown back at the personnel trying to stop the system. This could cause tremendous injury. The 2×4 may also damage the equipment as it brings the system to a stop and induces an unsafe shock load. Similarly, rope is also a poor solution. Given the large amount of mechanical inertia, the rope may not actually keep the fan isolated if ambient conditions, such as high winds, force it to rotate. Additionally, the rope can only be installed if the system is already stopped. This would require personnel to find some other way to stop the fan. Unfortunately, some have tried to slow fan blades physically with their hand only to find themselves overwhelmed and subjected to injury and fall hazards. Thus, both methods are not ideal for minimizing safety and resulted in documented OSHA Safety violations across the country. Additionally, OSHA regulations prohibit workers from being on top of cooling towers with wind speeds over 40 mph. In situations where a fan brake is not properly closed, and wind speeds are above the acceptable limit (when it would be desirable to ensure the brake is closed), it is not possible to check the manual brakes for proper engagement.

To address these concerns and restrict unintended movement of the fan assembly, mechanical braking (and/or locking) systems have been developed to restrict the movement of the fan assembly. A fan brake can be configured to engage one or more of the various components of a mechanical fan system to directly or indirectly isolate or stop the fan blades on the mechanical fan system from rotating. Most of these braking solutions operate manually and require personnel at the fan deck elevation to physically engage via manual turning of a wench or depression of a lever or button until such time the fan stops.

The manual brake does not fully alleviate the prior concerns identified. Manual brakes require personnel to manually actuate the assembly and the personnel must ascend to the fan deck to employ the brake. If manual actuation is performed during a storm event, the personnel will be exposed to dangerous wind conditions capable of producing the aforementioned airborne hazards. Not only does manual actuation place the safety of these personnel at risk, but in view of facilities reducing headcount in their maintenance staffs, the risk is exacerbated as fewer personnel are available to timely slow down, stop, and lock out multiple, in some cases upward of several dozen or more, cooling cells in a timely manner. As such a need exists to find a solution to the existing concern in view of personnel staffing reduction trends.

Electrical actuation of these braking devices may overcome the challenge of personnel having to climb to the top of the fan deck, but in the absence of a fan brake control system, damage to the fan system can occur. Damage can occur if the brake is applied remotely and the fan motor is called to start. The fan motor would work against the brake in this situation. If the fan motor overcomes the brake, then the brake and the mechanical fan system could be damaged as the motor breaks free of the locking device. If the fan motor does not overcome the brake then the motor could overheat, damaging the motor and creating an unsafe environment around the motor. The brake could also be applied when the fan motor is actively running, which could also damage the mechanical fan system as the system would be actively rotating while the brake would attempt to stop it. The brake is not meant for this instantaneous application and may become damaged as it tries to restrict the movement of the highly energized rotating system. Furthermore, if the brake is successful in stopping the energized system, a tremendous shock load could be induced into the system. This shock load could damage the gearbox, break the driveshaft, or cause any number of issues in the system.

Neither electrical actuation nor mechanical actuation of a brake assembly provide a way to safely slow the assembly if it is currently spinning. These fan assemblies can spin at speeds even higher than their intended operating speed in the right ambient conditions (e.g., windy conditions). In such a case, these fans cannot be locked out and secured with existing braking solutions. Existing solutions require the assembly to be stopped (or nearly stopped), because inducing a brake improperly at these high speeds could impose a harmful shock load on the mechanical components. This shock loading has been proven to break driveshafts, damage gearbox internals, and cause failures in parts of the mechanical fan system.

Brake position (i.e., engage or disengaged) is also critical if the device is remotely actuated. Without brake status information, the brake could be assumed to be engaged, when it is not. Alternatively, the brake could be engaged when personnel at the plant believe it is disengaged. Either situation could cause damage or an unsafe condition if the electric fan motor is started or is currently running. This damage would be the same shock loading that has been discussed above.

The brake must be capable of remaining locked in place if applied during an emergency or storm event. During such events, electricity could be lost locally, or at the facility as a whole. Loss of electricity is not an issue for the manual brake, as manual brakes do not require electricity. However, loss of electricity could present a challenge for electric brakes utilizing a solenoid for braking. Electricity must be applied to the solenoid to keep it locked or unlocked, and thus keep the brake engaged or disengaged. This means that brake position could change unintentionally if electricity is lost. Furthermore, requiring continuous electricity for operation (i.e., to keep the solenoid locked) is inefficient and could be a significant parasitic load for a facility with a large amount of brakes.

Various styles of fan brakes have been developed for and utilized in the cooling tower industry. Typically, the fan brake is mounted on the driveshaft between the electric motor and gearbox.

One example of a brake applied to cooling tower fans is a drum brake. A brake drum is mounted on the driveshaft such that a pair of friction pads may contact the drum. The drum brake is spring applied and is available in versions that can be released by either electrohydraulic, electromagnetic, hydraulic, or pneumatic action. Drum brakes work for holding/emergency stop applications that do not generate extreme heat or high shaft speed in normal operation. For example, in applications using a variable frequency vector drive to control shaft speed down to almost zero RPM prior to application of the brake, the drum brake is suitable. This is a result of low rubbing speed and low braking heat generation.

What is needed is a brake that overcomes the limitations of the drum brake and provides a control system that will automatically slow, stop, and lock in place rotating machinery without introducing shock load when turning at RPMs much greater than zero.

Another example of brakes currently found on cooling towers is a disc style manual fan brake. The manual fan brake utilizes a pair of brake pads arranged so that a rotor assembly mounted on the driveshaft runs between the brake pads. Applying the fan brake presses the brake pads on the rotor, increasing the friction on the rotor, slowing or stopping the fan. Releasing the disc style fan brake reduces the friction and allows the fan to rotate.

The disc style fan brake is operated by means of a manual actuator that is turned with a wrench. Turning the manual actuator in one direction moves the brake pads closer together applying the brake pads to the rotor and slowing or stopping the fan. Turning the manual actuator in the opposite direction moves the brake pads further apart releasing the rotor and allowing the fan to rotate. The disc style fan brake is continuously variable in that an infinite number of brake and rotor friction settings can be obtained with the manual actuator. In addition, once the wrench is removed from the manual actuator the disc style fan brake holds its last position without the need to maintain power, due to a lead screw on the brake having threads with a pitch that prevents the brake pads from loosening or working backwards on its own. The disc style fan brake can fully lock the rotor by turning the manual actuator in the proper direction and tightening the manual actuator to a specified torque. This provides repeatability as the disc style fan brake is always similarly locked, holding the fan in place.

What is needed are improvements in systems and methods for selectively reducing and/or suspending the circumferential momentum of fans, and particularly to fans utilized for mechanical draft evaporative cooling towers and air-cooled condensers.

SUMMARY

In one embodiment, a fan brake control system is provided, the system comprising: a fan brake; a position sensor; a microcontroller; an actuator; an operator interface; and a fan motor interface.

In one embodiment, a method of fan brake control is provided, the method including: a fan brake; a position sensor; a microcontroller; and an actuator; calibrating a position of the fan brake; receiving a brake open command; confirming that the fan brake is not already open; sending a signal to the actuator to rotate towards an open position; counting gear teeth in the actuator; and sending a signal to stop rotating upon reaching a preset gear teeth count.

In one embodiment, an automated manual fan brake is provided, the brake including: a rotor connected to a driveshaft, wherein the driveshaft is operatively connected to a fan assembly; an electric actuator including a rotating actuator shaft; and at least one brake pad; wherein the actuator shaft is connected to the at least one brake pad, and wherein the actuator causes the at least one brake pad to engage or disengage the rotor; and wherein the actuator shaft includes a manual override input to enable a wrench to manually turn the actuator shaft and cause the at least one brake pad to engage or disengage the rotor.

Another aspect of the present disclosure a fan brake system for controlling an industrial fan system, the fan brake system including a fan brake having a brake pad movable on the fan brake to selectively engage the fan system. An actuator including a motor can be operable to cause the fan brake to perform a braking procedure on the fan system to resist rotational movement of the fan system. A controller can be communicated with the actuator, the controller operable to selectively cause the actuator and the fan brake to perform the braking procedure, wherein the controller is operable to monitor and control power being supplied to the motor of the actuator during the braking procedure to maintain a torque output of the motor according to a predetermined torque profile during the braking procedure. Operating the motor of the actuator based on a predetermined torque profile can allow the performance of the motor to be driven by its output torque, and thus the torque applied to the fan system, which can help prevent damage to the fan system or the fan brake during the braking procedure, and particularly for larger fan systems operating at high speeds.

In some embodiments, the fan brake system can include a position sensor operable to monitor the position of the brake pad when the fan brake system is placed adjacent to the fan system. The controller can be communicated with the actuator and the position sensor, and the controller can be operable to selectively cause the actuator and the fan brake to perform the braking procedure. The controller can be selectively operable to perform an initialization procedure including the steps of: causing via the actuator the brake pad to move away from the fan system until the motor reaches a predetermined opening torque limit which indicates the fan brake pad is in a desired open position; causing via the actuator the brake pad to move toward and engage the fan system until a predetermined closing torque limit is reached which indicates the brake pad is in a desired closed position; calculating via the position sensor a target closing displacement distance travelled by the brake pad between the open position and the closed position; and returning the brake pad to the open position for the braking procedure. The target closing displacement distance can be utilized to verify during the braking procedure that the brake pad has in fact travelled to the desired or target closed position to ensure proper braking of the fan system.

The target closing displacement distance can also be utilized to detect certain default scenarios. For instance, if the brake pad has not travelling for a predetermined portion of the target closing displacement distance within an initial time frame of the braking procedure, for instance traveling at least 10 percent of the total closing displacement distance in the first 30 seconds of the braking procedure, it can indicate an issue in the brake pad such as a misalignment of the brake pad, motor, or another aspect of the fan brake system. The target closing displacement distance can also be utilized to determine if there are any obstructions in the line of movement for the brake pad. An obstruction would cause the motor to reach a predetermined torque limit and a zero rotational speed prematurely. However, if the target closing displacement distance has not been reached then the system can recognize that something has obstructed the brake pad's travel path.

Numerous other objects, advantages and features of the present disclosure will be readily apparent to those of skill in the art upon a review of the following drawings and description of a preferred embodiment.

BRIEF DESCRIPTION OF THE DRAWINGS

The accompanying figures, which are incorporated in and constitute a part of the specification, illustrate various example apparatuses and systems, and are used merely to illustrate various example embodiments. In the figures, like elements bear like reference numerals.

DETAILED DESCRIPTION

Figure 1:
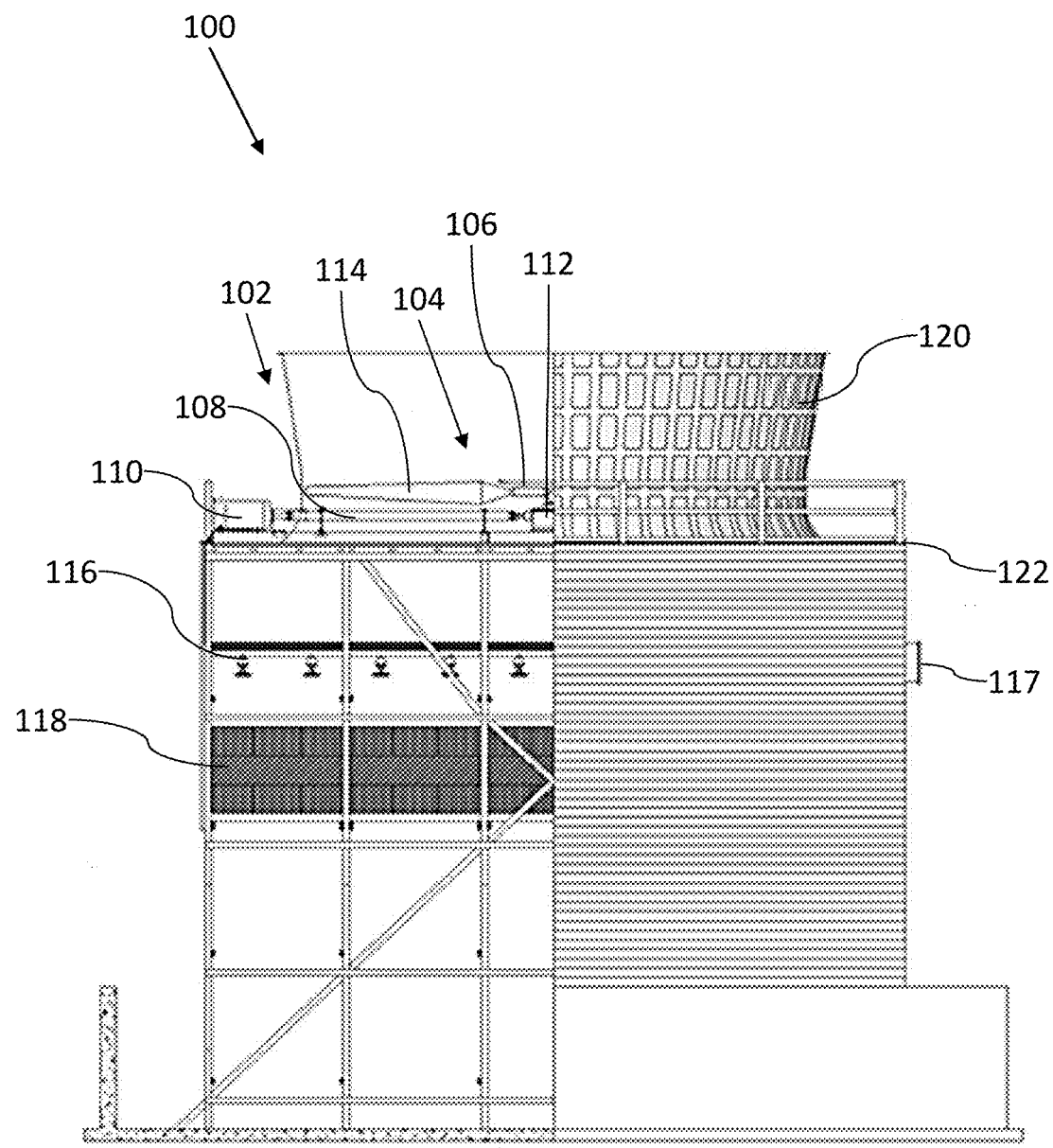
FIG. 1 illustrates a partial cutaway view of an example arrangement of a mechanical draft cooling tower.

FIG. 1 illustrates a partial cutaway view of a mechanical draft cooling tower 100. Cooling begins with the hot process water being pumped to the top of cooling tower 100, entering water inlet 117 of water distribution system 116. The hot process water is discharged from distribution system 116. Distribution system 116 spreads the water out across tower 100 and on top of fill media 118. Fill media 118 facilitates cooling by increasing the surface area of the water that is exposed to the air stream and suspending the water temporarily to increase the duration of interaction with the air.

There must be airflow through cooling tower 100 to generate the maximum evaporative cooling effect. Air flow can be generated with the use of a mechanical fan system 102, included in mechanical draft cooling tower 100.

The mechanical fan systems 102 in mechanical draft cooling towers 100 can be installed near the base of the cooling tower and drive air up through the cooling tower (forced draft system), or they can be installed on top of the cooling tower (induced draft system) to pull air through the system. In large field-erected applications the systems are most commonly induced draft type, installed on top of the cooling tower. The induced draft system design aids in driving the saturated exit air upward, and reduces the opportunity for recirculation of air that can compromise cooling tower performance.

In large cooling applications (i.e. power plants, industrial facilities, paper mills, chemical plants, HVAC, etc.) cooling towers 100 can be very large structures. Cooling towers 100 may be comprised of a plurality of individual units, typically known as cells. Each cell may have its own mechanical fan system 102 and water distribution system 116. The overall cooling tower can be made up of multiple cells, in many instances being at least 30 ft. (9.144 m) wide by 30 ft. (9.144 m) long by 30 ft. (9.144 m) tall, or larger.

Induced draft type, mechanical cooling towers' fan systems 102 are most often comprised of an electric motor 110, a driveshaft 108, a right angle gearbox 112 or speed reducer, and a fan assembly 104. In this common approach, the majority of the assembly is surrounded by a fan stack 120. Fan stack 120 is a structure, typically fiberglass, that surrounds fan assembly 104 and varies in height (typically 6 ft. (1.829 m) to 18 ft. (5.486 m)). The aforementioned components are usually on top of the structure at an elevation known as the fan deck 122.

The output shaft (not shown) of electric motor 110 may connect to driveshaft 108. Driveshaft 108 may extend through fan stack 120 and may connect to right-angle gearbox 112. An axle may extend from right-angle gearbox 112 to a fan hub 106. At least one fan blade 114 is connected to fan hub 106.

The induced draft mechanical system may alternatively include only electric motor 110 and fan assembly 104, without driveshaft 108, gear box 112, or a speed reducer. In such an embodiment, fan assembly 104 is mounted directly to a vertical output shaft (not shown), utilizing a coupling device. In other embodiments, the fan system can include a belt and pulley drive system, with a motor rotating a first pulley of the belt drive system, which drives a second pulley connected to the fan assembly.

The mechanical systems vary in size with the size of each cell and each cooling tower 100. Electric motor 110 may be as small as 5 horsepower (3.7 kW) and as large as 350 horsepower (261.0 kW). The fan size may vary, with some as small as 3 ft. (0.914 m) in diameter and others as large as 40 ft. (12.192 m) in diameter. This variation makes every installation different, each however containing a rotating fan with a tremendous amount of energy and rotational torque.

Figure 2:
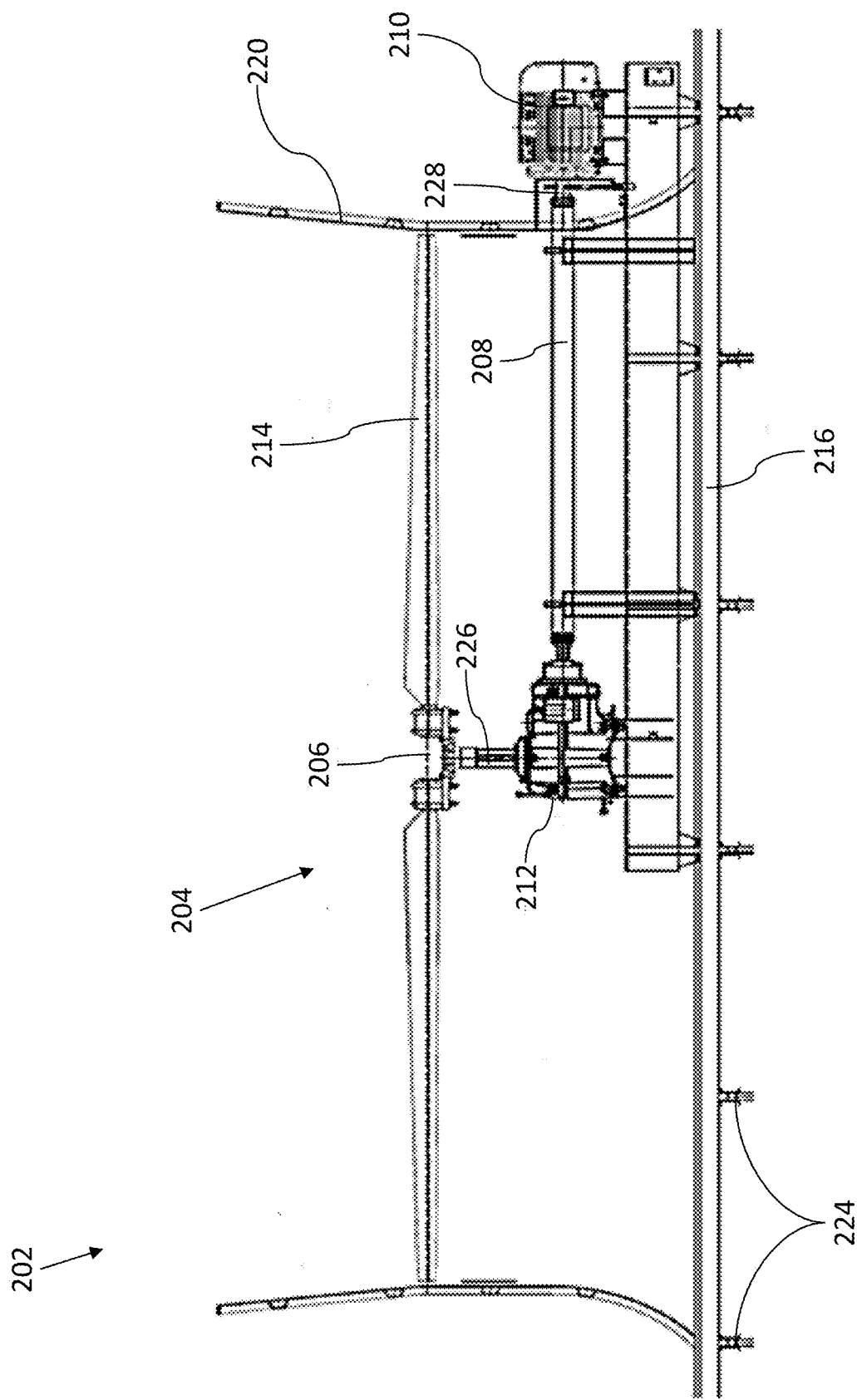
FIG. 2 illustrates a sectional view of an example arrangement of a mechanical fan system for a mechanical draft cooling tower.

FIG. 2 illustrates a sectional view of an example arrangement of a mechanical fan system 202 for a mechanical draft cooling tower. System 202 may include a fan assembly 204, including a fan hub 206 and at least one fan blade 214 extending from fan hub 206. System 202 may include an electric motor 210, a drive shaft 208, and a right angle gearbox 212 or speed reducer. Fan assembly 204 may be surrounded at least partially by a fan stack 220.

Electric motor 210 may include a motor output shaft 228, which may be connected to driveshaft 208. Driveshaft 208 may be connected to gearbox 212, such that electric motor 210 causes output shaft 228 to rotate, which in turn causes driveshaft 208 to rotate, which in turn causes a fan axle 226 extending from gearbox 212 to hub 206 to rotate. As a result, electric motor 210 causes fan assembly 204 to rotate.

Also illustrated is a water distribution system which may include a plurality of nozzles 224 for distributing process water beneath the fan stack 220.

Figure 3:
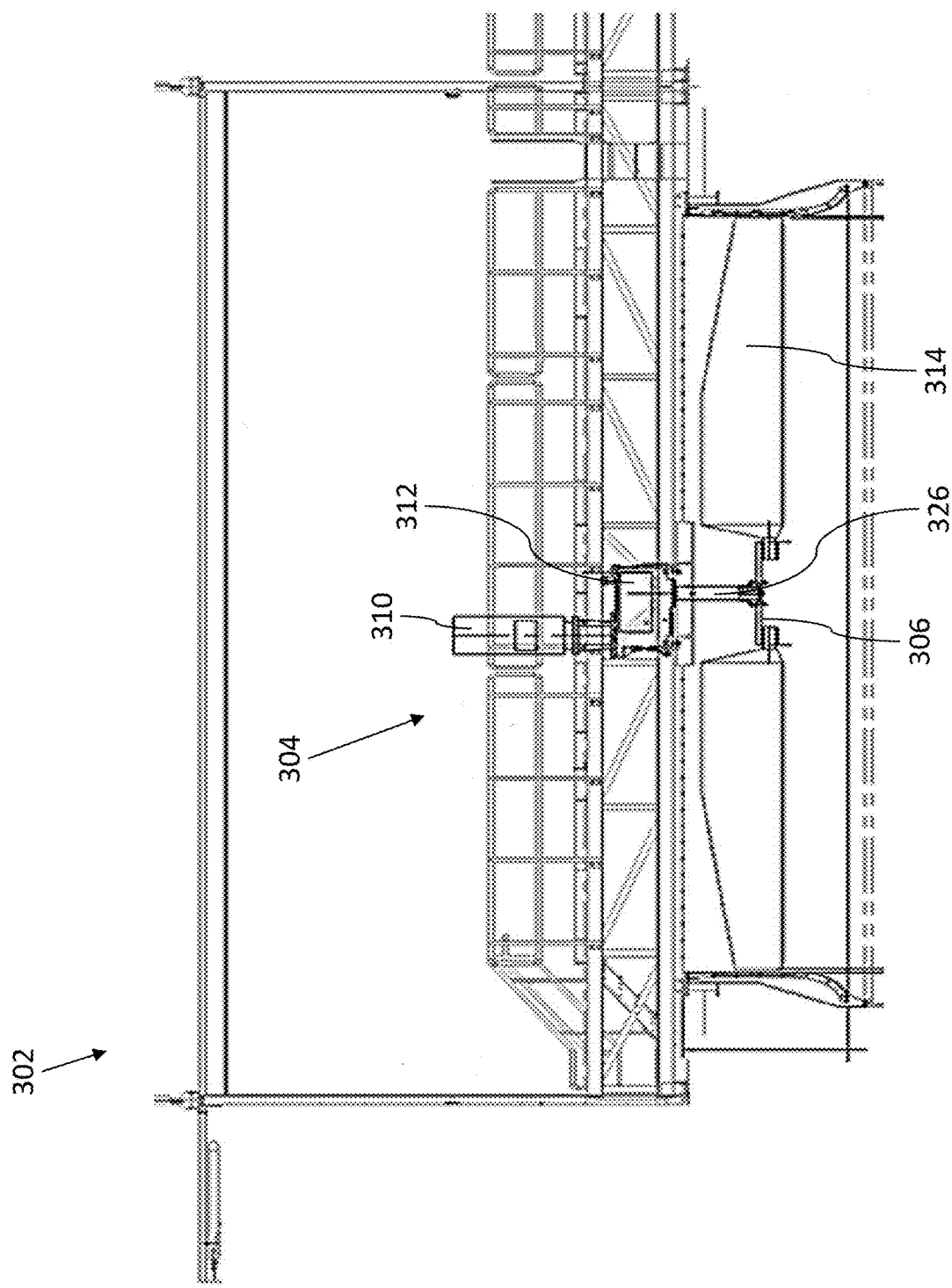
FIG. 3 illustrates a sectional view of an example arrangement of a mechanical fan system for an air-cooled condenser.

The same nuances and challenges solved by the innovations disclosed herein may also exist in air cooled condensers. FIG. 3 illustrates a sectional view of an example arrangement of a mechanical fan system 302 for an air-cooled condenser. Air cooled condensers may use mechanical equipment nearly identical to that of a cooling tower (such as tower 100). Air cooled condensers may utilize dry cooling as a method to cool process water in lieu of wet, evaporative cooling. To drive airflow across the cooling coils, air cooled condenser systems make use of similar electric motors (such as electric motor 310), fan assemblies (such as fan assembly 304), and gearboxes (such as a parallel gearbox 312). Fan assembly 304 may include a fan hub 306 connected to at least one fan blade 314. Fan hub 306 may be connected to gearbox 312 by a fan axle 326 extending therebetween, such that rotation of electric motor 310 causes gearbox 312 to rotate, which in turn causes fan axle 326, hub 306, and blades 314 to rotate.

An example of brakes currently found on cooling towers is the disc style manual fan brake. The disc style manual fan brake may utilize a pair of brake pads arranged so that a rotor assembly mounted on the driveshaft runs between the brake pads. Applying the disc style fan brake increases the friction on the rotor, slowing or stopping the fan. Releasing the disc style fan brake reduces the friction and allows the fan to rotate.

Existing disc style manual fan brakes may be operated by a manual actuator that is turned with a wrench. Turning the manual actuator in one direction moves the brake pads closer together applying the fan brake to the rotor and slowing or stopping the fan. Turning the manual actuator in the opposite direction moves the brake pads further apart releasing the fan brake from the rotor and allowing the fan to rotate. The disc style manual fan brake may be continuously variable in that an infinite number of brake and rotor friction settings can be obtained with the manual actuator. In addition, once the wrench is removed from the manual actuator, the fan brake holds its last position without the need to maintain power. The fan brake may fully lock the rotor by turning the manual actuator in the proper direction and tightening the manual actuator to a specified torque. This may provide repeatability as the fan brake is always similarly locked, holding the fan in place.

To improve upon the aforementioned disc style manual fan brake, a system is disclosed to add intelligence to the disc style fan brake while maintaining the ability to operate the disc style fan brake manually if desired. A control system is disclosed, wherein the control system is designed to selectively slow, stop, or lock into place rotating machinery that is turning at an RPM that may be much greater than zero while helping minimize shock load. Such a system may protect from harm both personnel and equipment. The control system may be adaptable to machinery of different size and mass. The control system may also be adaptable to other brakes or lock out devices that are operated mechanically, electrically, pneumatically, or with hydraulics.

Figure 4:
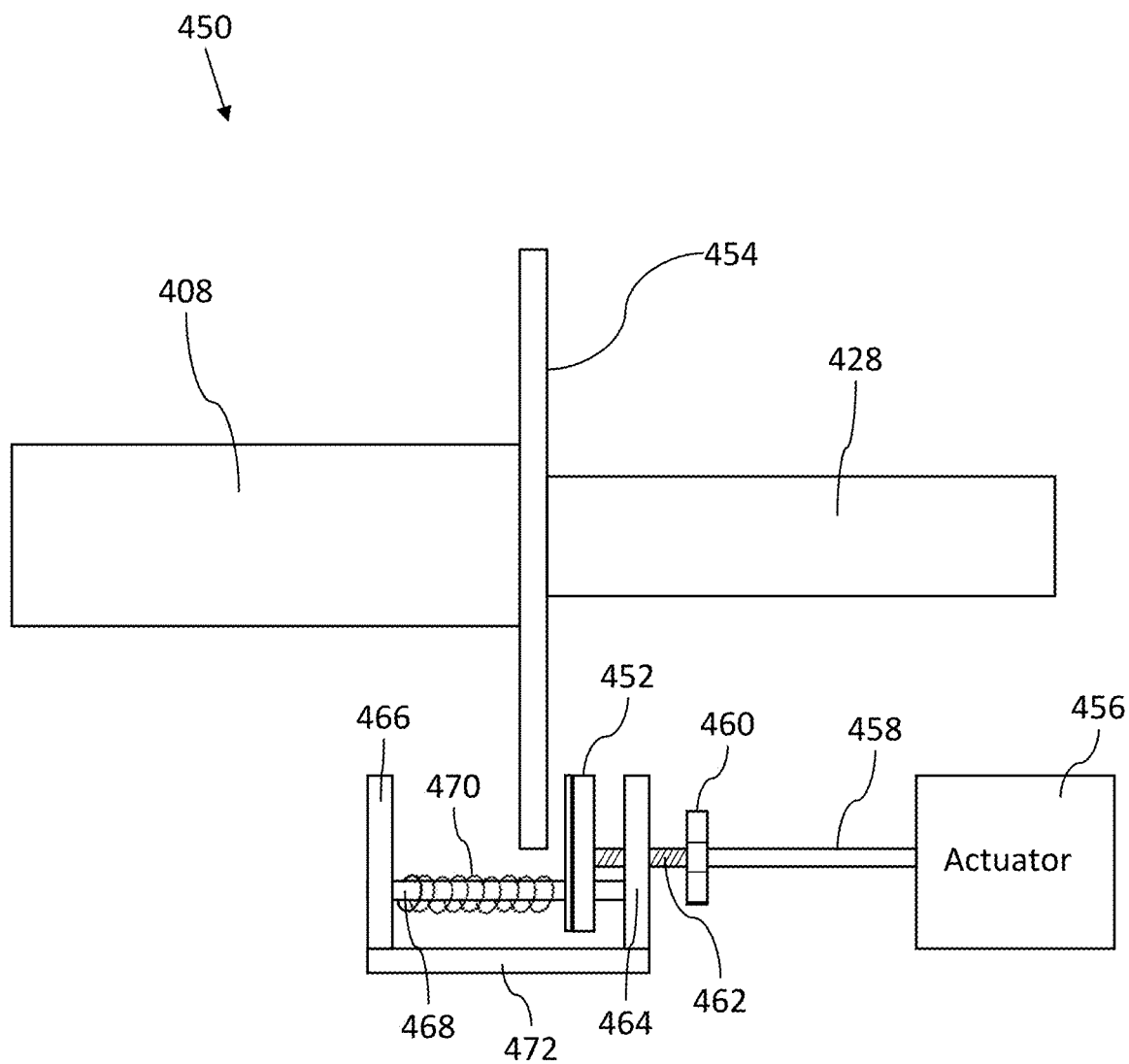
FIG. 4 illustrates an elevational view of an example arrangement of an automated manual fan brake.

FIG. 4 illustrates an elevational view of an example arrangement of an automated manual fan brake system 450. In some embodiments, fan brake system 450 may include a rotor 454. Rotor 454 may be substantially disc-shaped.

At least one shaft may be connected to rotor 454. At least one of a driveshaft 408 and a motor output shaft 428 may be connected to rotor 454, and rotor 454 may rotate with one or both. Rotor 454 may be connected to both motor output shaft 428 and driveshaft 408, on opposite sides of rotor 454, and motor output shaft 428, drive shaft 408, and rotor 454 may rotate together in a 1:1 ratio. Drive shaft 408 is operatively connected to a fan assembly (not shown).

Brake system 450 may include at least one brake pad 452 in proximity with and configured to engage rotor 454. Similar to the manual fan brake described above, the at least one brake pad 452 may selectively extend into contact with and retract out of contact from rotor 454, to selectively apply braking force and remove braking force (respectively) to and from rotor 454 and at least one of driveshaft 408 and output shaft 428. Brake 450 may include two brake pads 452, with one oriented on a proximal side of rotor 454, and the other oriented on the distal side of rotor 454 relative to the motor. The two opposing brake pads 452 may selectively extend into contact with rotor 454 to exert braking force upon rotor 454 from either side of the rotor 454.

Brake system 450 may include an actuator 456. Actuator 456 may include any of a variety of actuators, including for example any of electrically-powered, pneumatically-powered, and hydraulically-powered actuators.

Actuator 456 may rotate or translate an actuator shaft 458. Actuator shaft 458 may be connected to at least one brake pad 452 to cause at least one brake pad 452 to selectively translate into and out of contact with rotor 454, to selectively apply and remove braking force to and from rotor 454.

Where actuator 456 rotates actuator shaft 458, actuator shaft 458 includes shaft threads 462. Shaft 458 may pass through a threaded aperture in a proximal brake frame member 464, which may support and engage shaft 458. Proximal brake frame member 464 may include female threads that engage male shaft threads 462. As such, rotation of shaft 458 may cause translation of shaft 458 relative to proximal brake frame member 464, which in turn results in translation of brake pad 452 relative to proximal brake frame member 464. Such translation may selectively place brake pad 452 into and out of contact with rotor 454.

Proximal brake frame member 464 may be connected to a distal brake frame member 466 via a base member 472. Proximal brake frame member 464 and distal brake frame member 466 may be oriented on opposite sides of rotor 454.

In one embodiment, distal brake frame member 466 includes a second brake pad, configured to apply braking force to rotor 454 opposite the illustrated brake pad 452. For example, base member 472 may translate in a direction parallel to actuator shaft 458, thus allowing brake pad 452 and a second brake pad (not shown) oriented on distal brake frame member 466 to engage rotor 454 in a pinching manner.

Brake pad 452 may slide and translate (parallel to actuator shaft 458) on at least one brake pad guide member 468. At least one guide member 468 may extend between proximal brake frame member 464 and distal brake frame member 466. A biasing member 470 may be oriented generally between distal brake frame member 466 and brake pad 452 to bias brake pad 452 and distal brake frame member 466 away from one another to ensure release of brake pad(s) 452 from rotor 454 when desired (e.g., when actuator rotates shaft 458 so as to pull brake pad 452 away from rotor 454). Biasing member 470 may be a spring. Biasing member 470 may be a coil spring extending around and along guide member 468.

To allow a manual override of actuator 456 in the event of an electric power failure, equipment failure, or other damage to brake 450, a manual override input 460 may be oriented on actuator shaft 458. Manual override input 460 may permit a user to manually rotate actuator shaft 458 (e.g., using a wrench where manual override input 460 is hexagonal, square, or any shape having opposing parallel sides) to cause brake pad(s) 452 to engage or disengage rotor 454.

Figure 13:
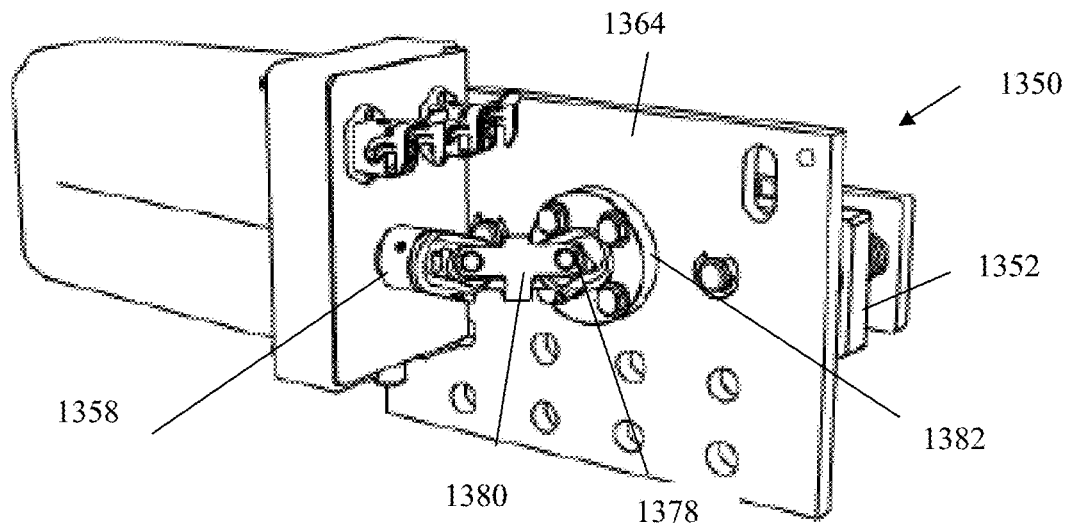
FIG. 13 illustrates a side perspective view of another embodiment of a fan brake system of the present disclosure.
Figure 14:
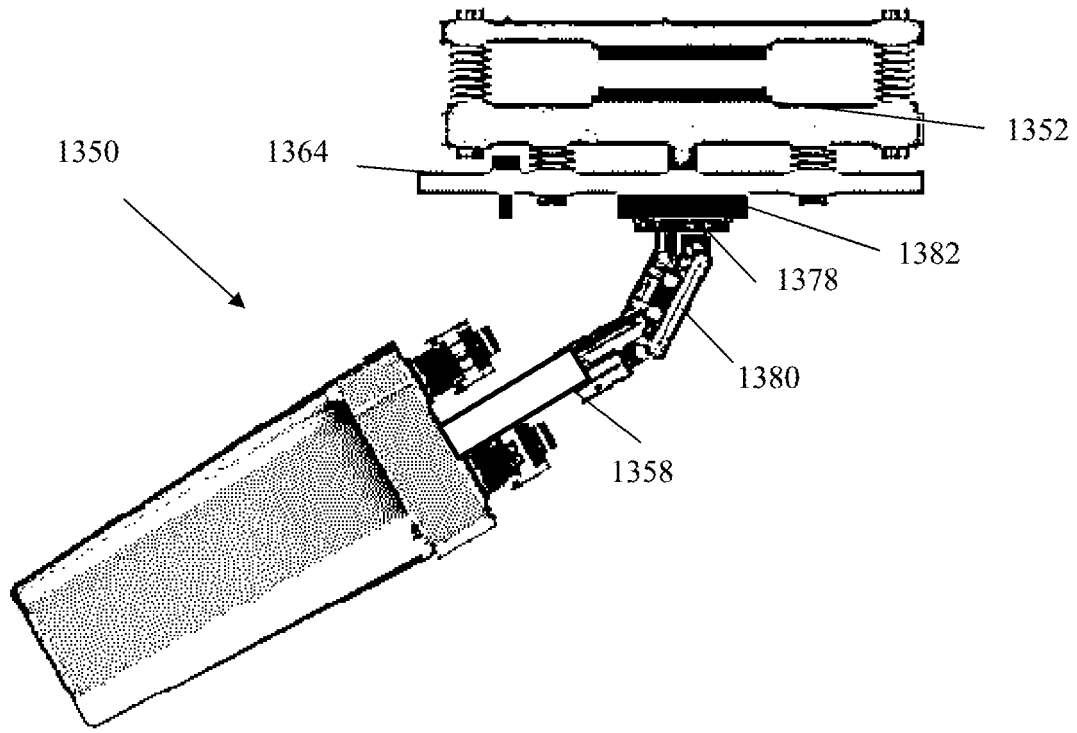
FIG. 14 illustrates a top view of the fan brake system of FIG. 13.
Figure 15:
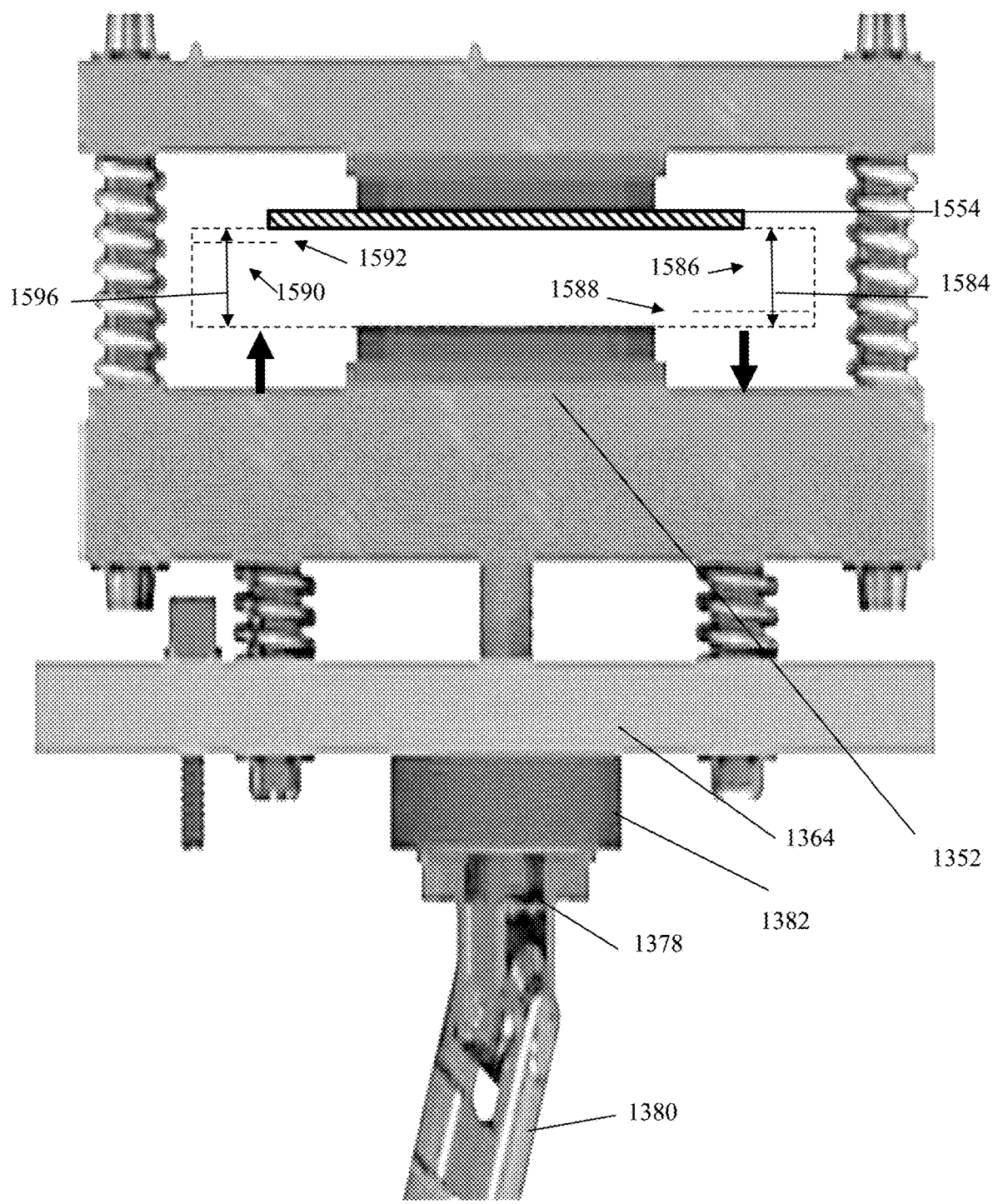
FIG. 15 illustrates a detailed view of the fan brake system of FIG. 14 positioned about a fan brake disc on a fan system.

Another embodiment of a fan brake system 1350 of the present disclosure is shown in FIGS. 13-15. The actuator shaft 1358 connects to a U-Joint 1378 that transmits power 90 degrees to a connection with a lead screw 1380 rotatably disposed on a proximal brake frame member 1364. When the actuator motor rotates, the motor can turn the actuation shaft 1358 either directly or through a geared connection. This turns the U-Joint 1378, which then turns the lead screw 1380. When the lead screw 1378 rotates it moves a plunger 1382 that drives the brake pad plate 1352 fitted with the brake pad towards or away from the brake disc or rotor on the fan system. A second brake pad plate 1386 can remain in a fixed position. The pitch of the lead screw 1378 are such that the screw 1378 will not back out from a set position. The lead screw 1378 must be rotated to move the brake pad 1352. This provides the beneficial feature of failing in place, not open or close. The springs are used to help guide the plates back and forth and provide overall stability to the brake system.

Figure 5:
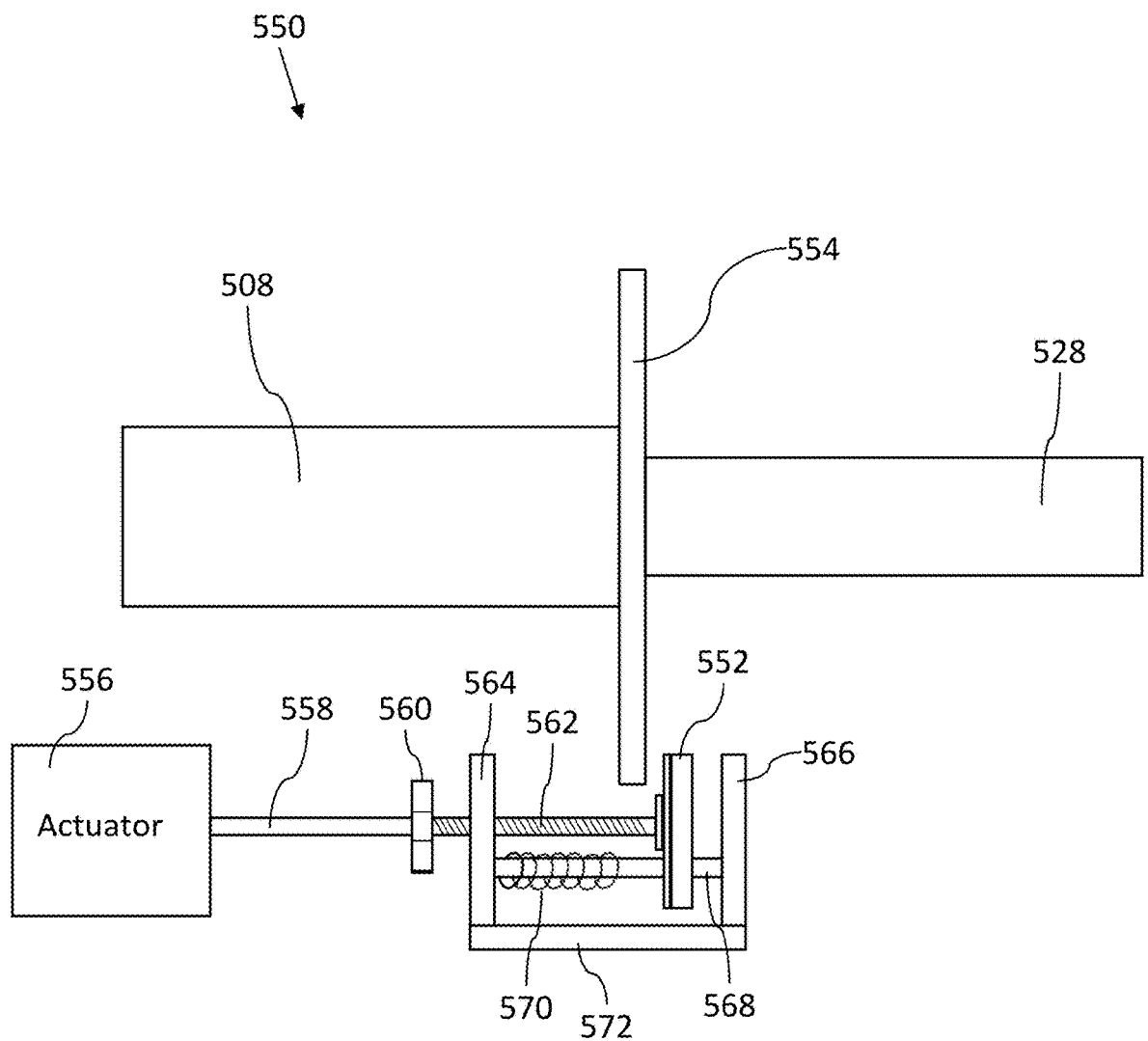
FIG. 5 illustrates an elevational view of an example arrangement of an automated manual fan brake.

FIG. 5 illustrates an elevational view of an example arrangement of an automated manual fan brake 550. Brake 550 is substantially similar in operation to brake 440, except as noted specifically below.

Brake 550 may include a rotor 554 connected to at least one of a motor output shaft 528 and a driveshaft 508. In other embodiments, the fan brake 550 can engage any suitable portion of the fan system including the output shaft 528, driveshaft 508, gearbox 112, or fan assembly 104 (shown in FIG. 1), Brake 550 may include an actuator 556 connected to an actuator shaft 558. Actuator shaft 558 may include shaft threads 562, which engage threads in a proximal brake frame member 564. Brake 550 may include a base member 572 connecting proximal brake frame member 564 with a distal brake frame member 566. Base member 572 may slide parallel to actuator shaft 558. A brake pad guide member 568 may extend between proximal brake frame member 564 and distal brake frame member 566.

Similar to brake 450, actuator 556 may cause at least one brake pad 552 to translate into and out of contact with rotor 554. However, contrary to the design of brake 450, brake 550 pulls at least one brake pad 452 into contact with rotor 554, rather than push.

Brake 550 may include a biasing member 570 configured to bias brake pad 552 away from rotor 554.

Brake 550 may include a manual override input 560 oriented on actuator shaft 558.

Figure 6:
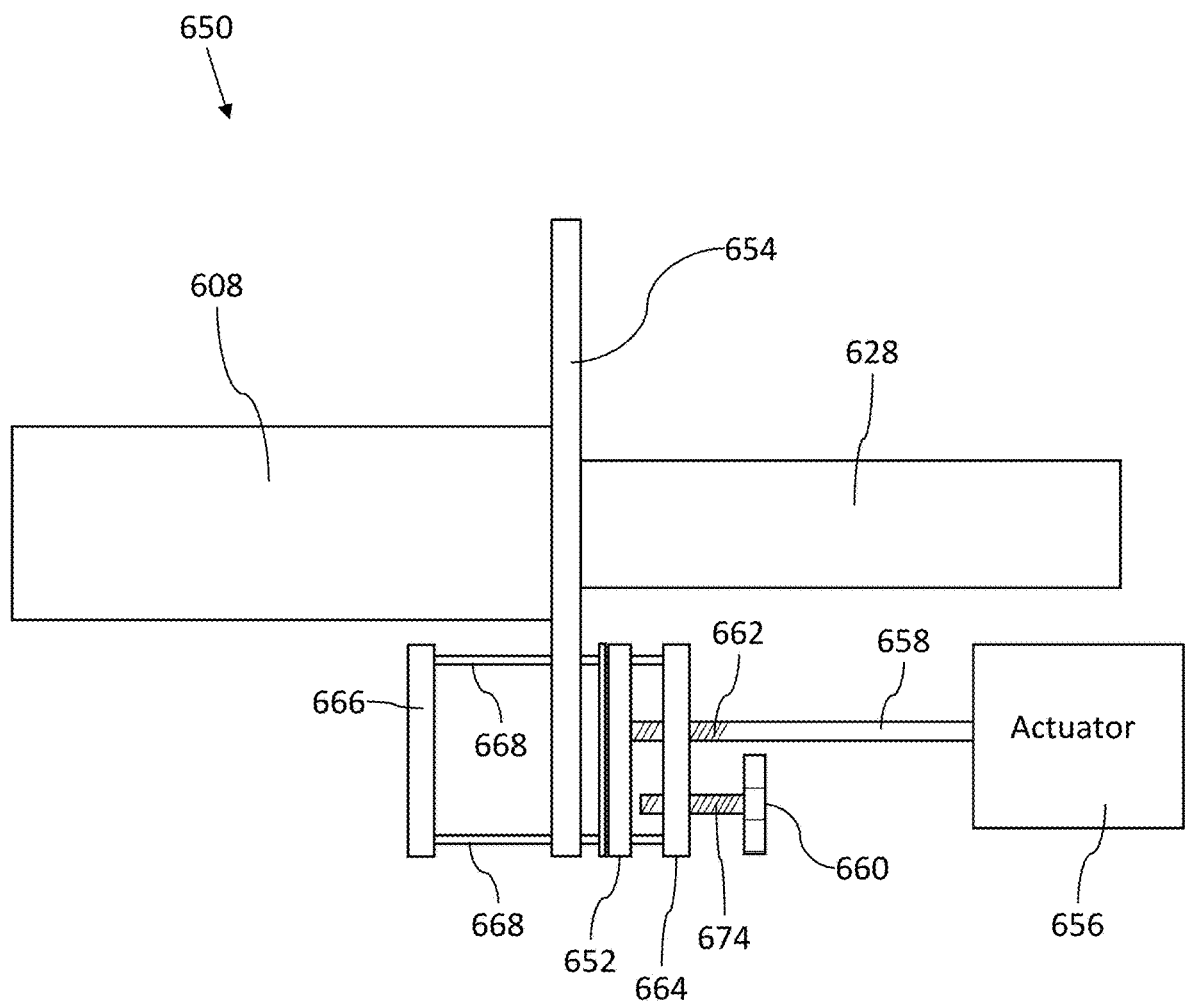
FIG. 6 illustrates a plan view of an example arrangement of an automated manual fan brake.

FIG. 6 illustrates a plan view of an example arrangement of an automated manual fan brake 650. Brake 650 is substantially similar in operation to brake 440, except as noted specifically below.

Brake 650 may include a rotor 654 connected to at least one of a motor output shaft 628 and a driveshaft 608.

Brake 650 may include an actuator 656 connected to an actuator shaft 658. Actuator shaft 658 may include shaft threads 662, which engage threads in a proximal brake frame member 664. Brake 650 may include a base member connecting proximal brake frame member 664 with a distal brake frame member 666. Base member may slide parallel to actuator shaft 658. A plurality of brake pad guide members 668 may extend between proximal brake frame member 664 and distal brake frame member 666.

Similar to brake 450, actuator 656 may cause at least one brake pad 652 to translate into and out of contact with rotor 654. Actuator 656 may push at least one brake pad 652 into contact with rotor 654.

Brake 650 may include a manual override input 660. However, unlike brake 450, manual override input 660 is not oriented on actuator shaft 658, but rather, is separate from actuator shaft 658. Manual override input 660 may include manual override input threads 674, configured to engage threads within proximal brake frame member 664. In such an embodiment, where actuator 656 is unable to actuate brake pad 652 due to electric power loss, equipment failure, or the like, manual override input 660 may be able to manually actuate at least one brake pad 652, for example by use of a wrench to rotate manual override input 660.

Figure 7:
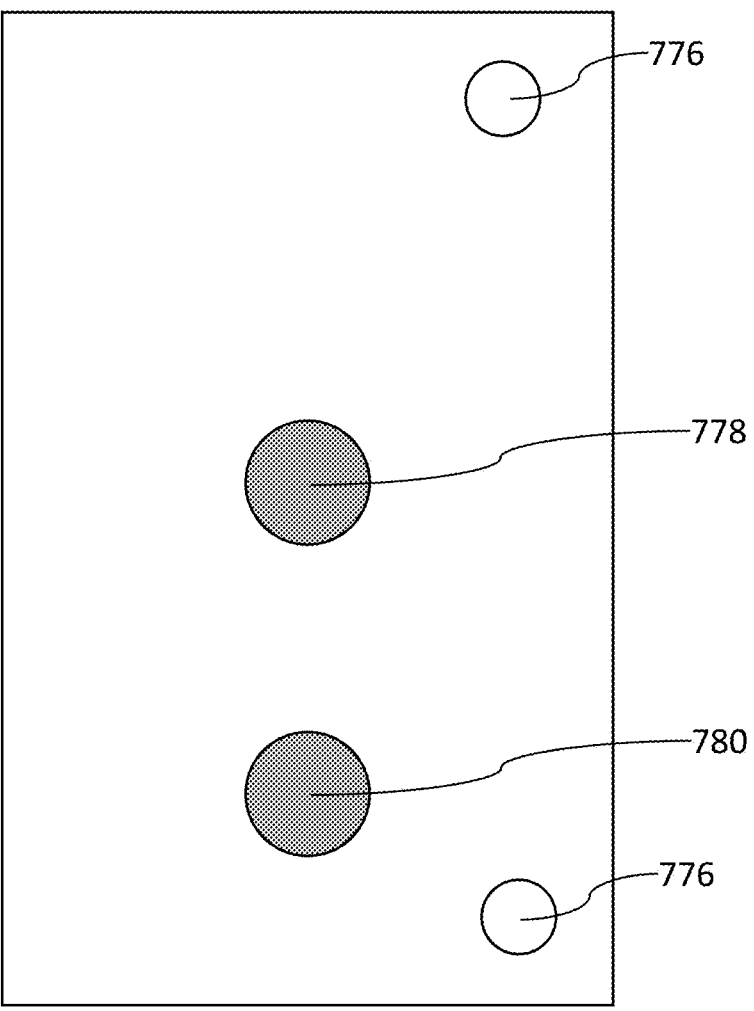
FIG. 7 illustrates a plan view of an example arrangement of a brake pad for use with an automated manual fan brake.

FIG. 7 illustrates a plan view of an example arrangement of brake pad 652 for use with an automated manual fan brake 650. Brake pad 652 may include at least one guide member aperture 776 to permit at least one guide member 668 (see FIG. 6) to pass through brake pad 652. Brake pad 652 may include at least two guide member apertures 776 oriented generally on opposite ends of brake pad 652.

Brake pad 652 may include an actuator shaft engagement element 778. Actuator shaft engagement element 778 may connect brake pad 652 to actuator shaft 658 (see FIG. 6) to permit actuator shaft 658 to cause brake pad 652 to translate toward and from rotor 654 (see FIG. 6).

Brake pad 652 may include a manual override shaft engagement element 780. Manual override shaft engagement element 780 may connect brake pad 652 to manual override input 660 (see FIG. 6) to permit manual override input 660 to cause brake pad 652 to translate toward and from rotor 654 (see FIG. 6).

Figure 8:
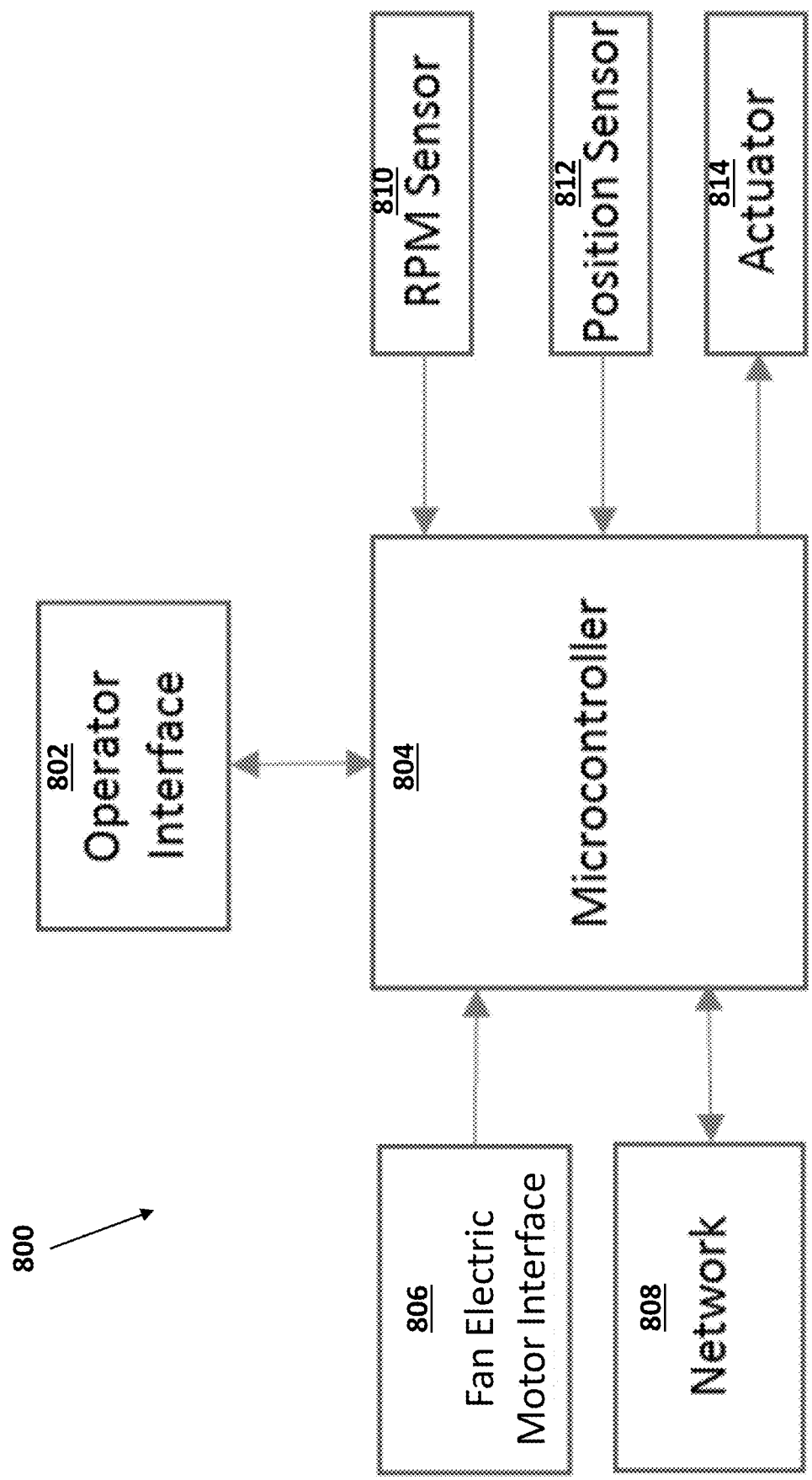
FIG. 8 illustrates a block diagram identifying components of a fan brake control system.

FIG. 8 illustrates a block diagram identifying components of a fan brake control system 800.

A microcontroller 804 operates the fan brake by generating signals to an actuator 814. Microcontroller 804 is responsive to a predetermined software program and makes decisions based on a combination of operator set points and feedback from multiple sensors. The microcontroller also communicates to an operator interface 802 to provide fan brake status information and receive operator set point data. In addition, the microcontroller may communicate with an external network 808 to provide the capability of uploading new programs, receiving set point data, and/or providing remote diagnostics and trouble shooting.

Operator interface 802 can include a brake open and brake close push button switch, a brake opened and brake closed indicator light, and a status indicator light. A touch screen operator interface 802 with digital display may be utilized. Operator interface 802 may provide for local control of the fan brake and the setting of pre-determined parameters.

An electric motor may be used for actuator 814. The electric motor can include gearing to rotate the actuation shaft of the manual fan brake in either direction responsive to signals from microcontroller 804. This relationship between actuator 814 and microcontroller 804 automates the rotation of the manual actuator (actuation shaft). However, the ability to rotate the actuation shaft with a wrench can be retained.

A hall effect gear tooth sensor can be used for a position sensor 812. Position sensor 812 communicates to microcontroller 804 how much the actuation shaft has been rotated by the electric motor (actuator 814) and therefore the degree of linear brake engagement or movement of a brake pad of the fan brake system as a result of such rotation. Position sensor 812 in some embodiments can perform this function by counting gear teeth. Position sensor 812 is mounted on the fan brake to sense the rotation of the gears turning the actuation shaft. Other applicable sensors for use as the position sensor may include, but are not limited to: variable reluctance sensors, magneto-resistive sensors, inductive sensors, optical sensors, and proximity sensors and quadrature gear tooth sensors. In some embodiments, the position sensor 812 may monitor the direct linear motion of either the actuator shaft or the brake pad to determine change in the linear position of such components. In some embodiments, the position sensor 812 can also be utilized as a speed sensor to detect the rotational speed of the actuation shaft or the linear speed of the brake pad by providing position information along with a time stamp. A rotational or linear velocity of the actuator shaft or the brake pad can then be calculated using such time stamps.

A hall effect gear tooth sensor can also be utilized as a fan RPM sensor 810. RPM sensor 810, while optional, provides the added capability of indicating to microcontroller 804 that the fan driveshaft is rotating. This data can also displayed for the operator. RPM sensor 810 is mounted on the manual fan brake to sense the rotation of the rotor or driveshaft. Other applicable sensors for use as position and/or the RPM sensor may include, but are not limited to: inductive sensors, optical sensors, and proximity sensors.

A relay is used for a fan electric motor interface 806. Fan electric motor interface 806 communicates to microcontroller 804 that the main drive motor (electric motor) for the cooling tower fan is on or running.

When power is first applied to control system 800, microcontroller 804 does not know the position of the fan brake or the relative friction between the brake pad(s) and the rotor. For example, even if the last position was memorized in non-volatile memory, it is possible that the manual actuator was turned by an operator with a wrench changing the fan brake position with the power off. Therefore, control system 800 first calibrates to accurately determine the fan brake position.

At power-up, no signal is applied to actuator 814 and an appropriate alarm signal is communicated to the network 808 and operator interface 802 indicating that control system 800 is not ready.

Upon receiving a signal to open or close the fan brake, microcontroller 804 starts the calibration process by sending a signal to the electric motor actuator 814. Position sensor 812 counts the number of gear teeth as they pass due to the rotation of the actuation shaft.

If a pre-determined number of gear teeth are counted by position sensor 812, then the true position of the brake has been successfully determined. Microcontroller 804 then sends the appropriate signal to electric motor actuator 814 to go to the commanded position (open or closed). The alarm signal is then cleared, and the appropriate open or closed signal is generated.

If a pre-determined number of gear teeth are not counted by position sensor 812, then microcontroller 804 sends the appropriate signal to electric motor actuator 814 to reverse direction. Position sensor 812 again counts the number of gear teeth as they pass due to the rotation of the actuation shaft. If a pre-determined number of gear teeth are counted by position sensor 812, then the true position of the fan brake has been successfully determined. Microcontroller 804 then sends the appropriate signal to electric motor actuator 814 to go to the commanded position (open or closed). The alarm signal is then cleared, and the appropriate open or closed signal is generated.

If this sequence of operating electric motor actuator 814 in both directions does not result in a pre-determined number of gear teeth being counted by position sensor 812, then the true position of the fan brake has not been successfully determined. The alarm signal and the not ready signal are then maintained. This is a fault condition requiring service of the fan brake.

This sequence acts to provide automatic fault detection of the control system and fan brake. In addition, the sequence acts to provide accurate positioning of the fan brake and thereby relative friction between the brake pads and rotor.

Figure 9:
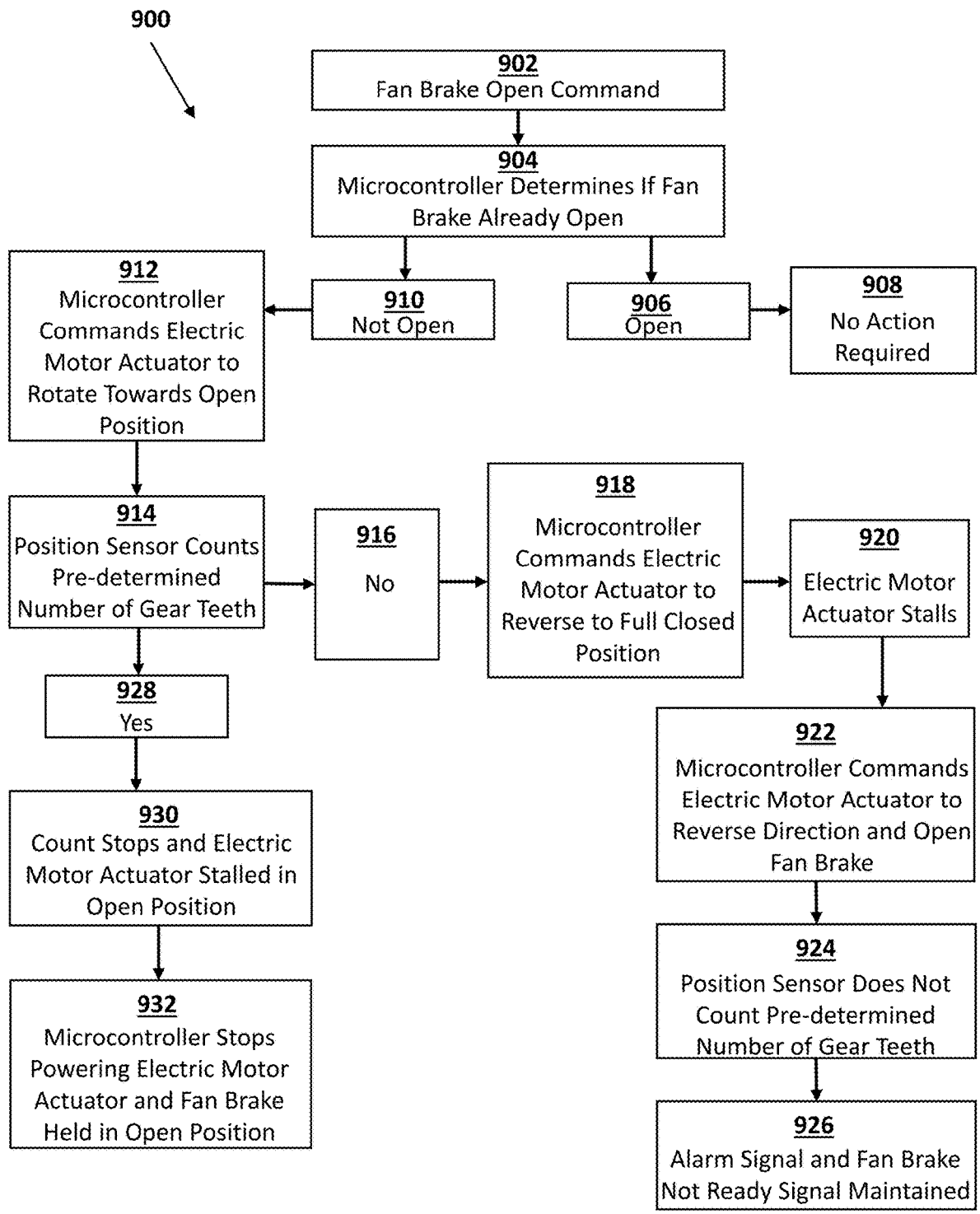
FIG. 9 illustrates a method for determining open status of a fan brake control system.

FIG. 9 illustrates a method 900 for determining open status of a fan brake control system. In response to a fan brake open command 902, the microcontroller first checks to determine if the fan brake is already open 904. If the fan brake is already open 906, there is no further action 908. If the fan brake is not open 910, the microcontroller sends a signal to the electric motor actuator to rotate towards the open position 912. The position sensor counts the number of gear teeth that pass the sensor 914. If a pre-determined number of teeth pass 928 and then the count stops, the electric motor actuator has stalled in the fan brake open position 930. The microcontroller stops powering the electric motor actuator and the fan brake is held in the open position 932. If there is a loss of power, the fan brake remains in the open position. This is a beneficial feature, in that the system holds its position in the case of a power loss.

If the pre-determined number of gear teeth do not pass the position sensor 916, then the microcontroller sends a signal to the electric motor actuator to reverse to the full closed position 918. Once the electric motor actuator stalls and the position sensor stops counting gear teeth passing 920, the microcontroller sends a signal to the electric motor actuator to reverse direction and open the fan brake 922. If a pre-determined number of gear teeth do not pass the position sensor 924 then the alarm signal and the fan brake not ready signal are maintained 926. This is a fault condition requiring service of the fan brake. This is a beneficial feature, in that the system provides automatic fault detection of the control system and manual fan brake.

Figure 10:
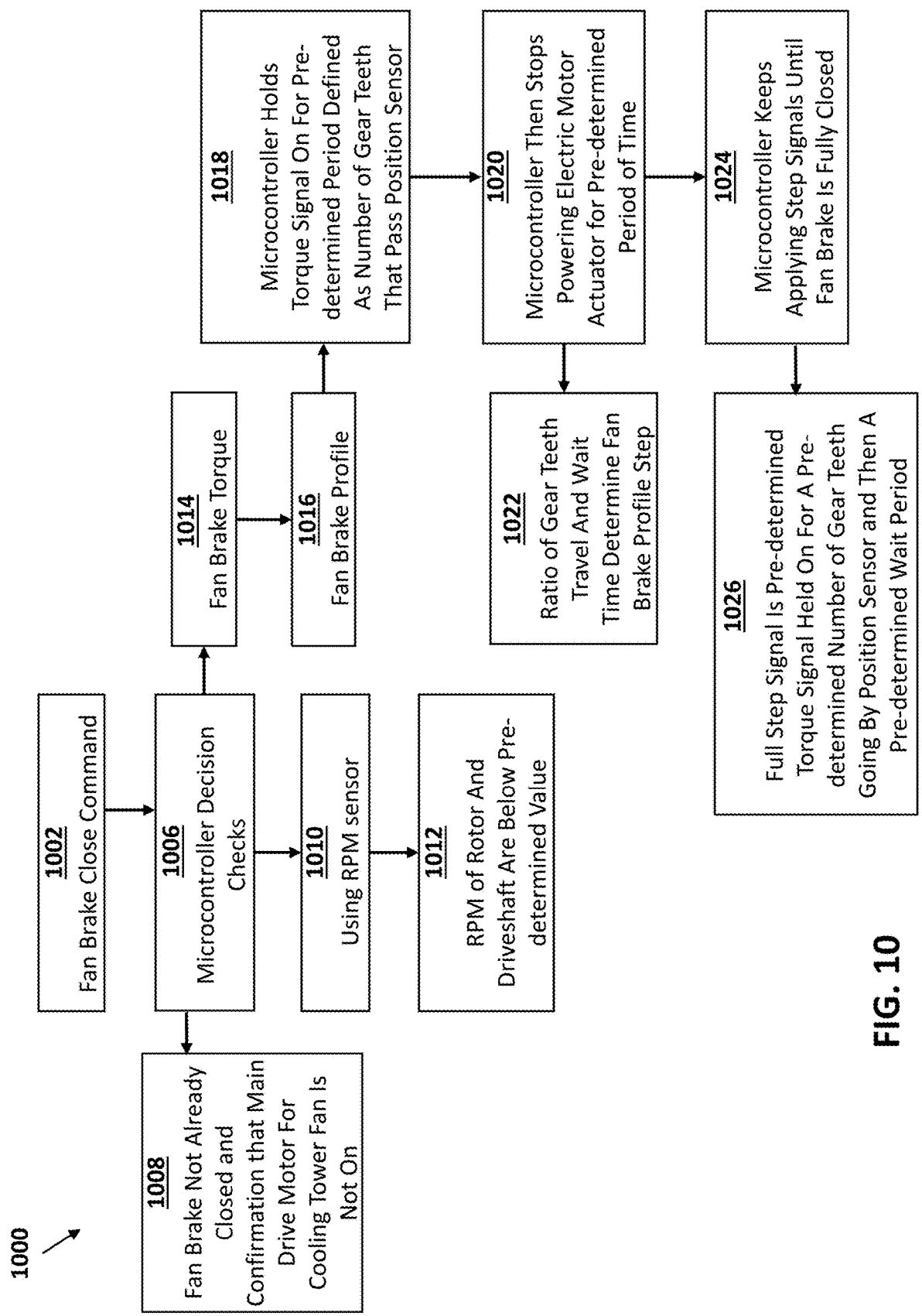
FIG. 10 illustrates a method for determining closed status of a fan brake control system.

FIG. 10 illustrates a method 1000 for determining closed status of a fan brake control system. In response to a fan brake close command 1002, the microcontroller conducts multiple decision checks 1006.

The first check by the microcontroller is to make sure the fan brake is not already closed and there is an additional check by the microcontroller to make sure the main drive motor for the cooling tower fan is not on 1008. The microcontroller uses the signal from the fan electric motor interface for this. This is beneficial in that it prevents the fan brake from closing when the main drive motor for the cooling tower is on.

If the optional RPM sensor is used 1010 the next check by the microcontroller is to determine that the RPM of the rotor and driveshaft are below a pre-determined value 1012. The RPM sensor is used for this check or a pre-determined time delay has expired that started when the main drive motor for the cooling tower fan was turned off. This allows the fan to slow naturally after it has been turned off.

The microcontroller then sends a signal to the electric motor actuator to rotate towards the close position. This is a complex signal which controls the torque with which the fan brake is closed and how smoothly the machinery being controlled is slowed and stopped as follows:

Referring now to FIGS. 4-10, another aspect of the present disclosure is a fan brake system for controlling an industrial fan system, the fan brake system including a fan brake 450 engageable with the fan system, the fan brake 450 including an actuator 814 operable to cause the fan brake 450 to selectively apply a brake force on the fan system to restrict rotational movement of the fan system. A controller 804 can be coupled to the actuator 814 of the fan brake system, the controller 804 operable to control the actuator 814. In some embodiments, the controller 804 can be communicated with the actuator 814. The controller 804 can be programmed to selectively cause the actuator 814 to apply a braking force on the fan system according to a braking profile 1016. The fan brake system can include one or more feedback sensors 806, 810, or 812 communicated with the controller 804. The controller 804 can be operable to adjust the braking profile applied to the fan system by the actuator 814 in response to receiving a feedback input from the one or more feedback sensors 806, 810, or 812.

The controller 804 can be any suitable device for controlling operation of the actuator 814, including but limited to a microcontroller, printed circuit board, an integrated control circuit, or a programmable logic controller. The controller 804 can be electrically or wirelessly communicated with the various components and/or sensors discussed herein. The controller 804 can selectively provide a control signal to the actuator 814 to control operation of the fan brake system and to control the braking force applied on a fan system.

Fan Brake Torque 1014 and Fan Brake Profiles 1016: The control signal going to the electric actuator 814 in some embodiments can be a continuous electric signal which is supplied to the actuator 814 for a predetermined amount of time corresponding to a movement of the fan brake pads 452 from a fully opened position to a fully closed position. This is beneficial in that the controller 804 can be programmed to generally provide a repeatable amount of fan brake closing torque every time the fan brake 450 closes. In such an embodiment, the braking profile 1016 can be a steady or linear increase in braking force applied to the fan system.

In other embodiments, the control signal can be a pulse width modulated signal ("PWM") with pre-determined intervals where electrical current is periodically supplied to the actuator 814 followed by a wait period where current is not supplied to the actuator 814. The total amount of time that the current is being supplied to the actuator 814 via the PWM signal can correspond to the amount of time needed for the actuator 814 to move the brake pad 452 from the opened position to the fully closed position. This automatically compensates for the wear in the brake pads. The PWM signal can produce a stepped braking profile where the braking force is increased for a period of time and then maintained constant during the waiting period. A stepped braking profile can allow the braking force applied to the fan system to be increased in increments, the waiting period allowing for the controller 804 to monitor the fan brake system to ensure that an undesirable shock load or other undesirable feedback in response to the incremental increase in the braking force is not observed or detected before additional braking force is applied to the fan system.

In some embodiments including an electric motor as the actuator 814, the controller 804 can send an electrical control signal to the actuator 814 which can cause the electric motor to produce a torque on the actuator shaft 458 to move the brake pads 452 either towards or away from the rotor 454 at predetermined incremental distances. The torque signal can be further manipulated by the microcontroller based on feedback from a position sensor 812 to create a fan brake profile which consists of multiple fan brake profile steps. This is accomplished by the microcontroller 804 supplying current to actuator 814 until the brake pad 452 translates over a predetermined distance corresponding to a defined number of gear teeth that pass the position sensor 1018. The microcontroller 804 then stops powering the electric motor actuator 814 for a pre-determined period of time 1020. The ratio of gear teeth travel and the wait time determine the fan brake profile step 1022. The microcontroller 804 continues applying step signals until the fan brake is fully closed 1024. Again, the full step signal is the pre-determined torque signal held on for a pre-determined number of gear teeth passing the position sensor and then a pre-determined wait period 1026. This creates a complete fan brake profile which determines how quickly and how much the friction on the rotor is increased for each step. This is a slow step by step tightening of the brake pad(s) to the rotor to increase the friction and braking force applied to the rotor in incremental steps. The microcontroller can store and use multiple fan brake profiles. This matches the mass of the machinery being controlled to the control system and is beneficial to automatically slow, stop, and lock in place rotating machinery that is turning at an RPM that may be much greater than zero while minimizing shock load. In other embodiments where the actuator 804 includes a hydraulic or pneumatic system, the hydraulic or pneumatic pressure can be increased at stepped intervals to produce a similar stepped braking profile 1016.

In some embodiments, the fan brake profile 1016 can include steps having varying travel distances or times. For instance it may be advantageous to have a longer step at the beginning of a braking process when the brake pad 452 is further away from the rotor 454, and decrease the step size as the brake pad 452 engages the rotor 454, as the braking force applied to fan system vs. the linear position of the brake pad 452 can increase much faster once the brake pad 452 engages the rotor 454. Additionally, the torque required by the actuator 804 can increase rapidly as the brake pad 452 engages the rotor 454 such that smaller steps can help prevent undesirable shock load or wear on the actuator 804, and particularly on a motor of an actuator 804.

In some embodiments, the feedback sensor can be an optional RPM sensor 810. The RPM sensor 810 can monitor the speed of a drive shaft 408 or another component of the fan system, and the controller 804 can adjust the braking profile 1016 for the actuator 814 according to the feedback received from the RPM sensor 810. For instance, to speed the complete closing of the fan brake 450, the microcontroller 804 can automatically reduce the wait period of the fan brake profile step to zero if the RPM sensor 810 reports the driveshaft 408 and rotor 454 have stopped turning. This action locks the fan in position as quickly as possible without introducing a shock load as the fan system is already stopped.

In some embodiments, the RPM sensor 810 can be used to monitor whether the fan system is rotating a speed that is greater than its normal operating speed, for instance in high wind situations. The braking profile 1016 can be adjusted by the controller 804 based on the RPM sensor 810 detecting a higher than normal fan system speed, in order to even more gradually apply a braking force to slowly reduce the speed of the fan system, thereby helping to avoid initial shock load on the fan brake system or the fan system.

In other embodiments, the RPM sensor 810 can be used to control the rate at which the brake pad 452 is advanced toward the rotor 454 by the actuator 814. For instance, the controller 804 can be programmed to monitor the rate at which the speed of the fan system decreases as the fan brake 450 engages the fan system. The controller 804 can be programmed to slow or stop the advancement of the brake pad 452, or reverse the direction of the brake pad 452, when the controller 804 determines that the speed of the fan system is decreasing at rate above a predetermined threshold value. Similarly, if the controller 804 determines that the rate of the decrease of the speed of the fan system is below a certain amount the controller 804 can be programmed to continue or speed up the advancement of the brake pad 452 towards the rotor 454.

One problem experienced with cooling tower fans when not powered, and not locked in place, is that the fans may rotate due to the wind load, and in some instances in a direction backward or opposite of the normal rotational direction of the fan system. When such a situation occurs, and the fan is rotating backwards, starting the main drive motor for the cooling tower fan can introduce a significant shock load that may cause damage to the fan system. The optional RPM sensor 810 is useful for alerting operators that the cooling tower fan is rotating in a reversed direction.

In some embodiments, the feedback sensor can be a fan electric motor interface 806. In some embodiments, the fan motor interface 806 can be a current sensor relay which can be communicated with the controller 804 to indicate to the controller 804 whether electric current is being supplied to the fan system. If a main drive motor for the cooling tower fan is on and the fan brake 450 is in any condition but fully open then the microcontroller 804 can send a control signal to the electric motor actuator 814 to fully open the fan brake 450 as quickly as possible. This additional safety feature is beneficial to prevent equipment damage that could occur by operating the main drive motor for the cooling tower fan with the fan brake 450 closed or engaged with the fan system of the cooling tower fan.

Governing Braking Torque Through Voltage and Power Control

It can be desirable for a brake force to be applied by the fan brake to the fan system in such a way so that the shock load induced is within a safe limit. A custom brake profile can be defined that steps the brake down onto the system in increments, increasing the brake force with each increment, but this approach will require a unique braking profile for each application, which can be cumbersome.

Figure 11:
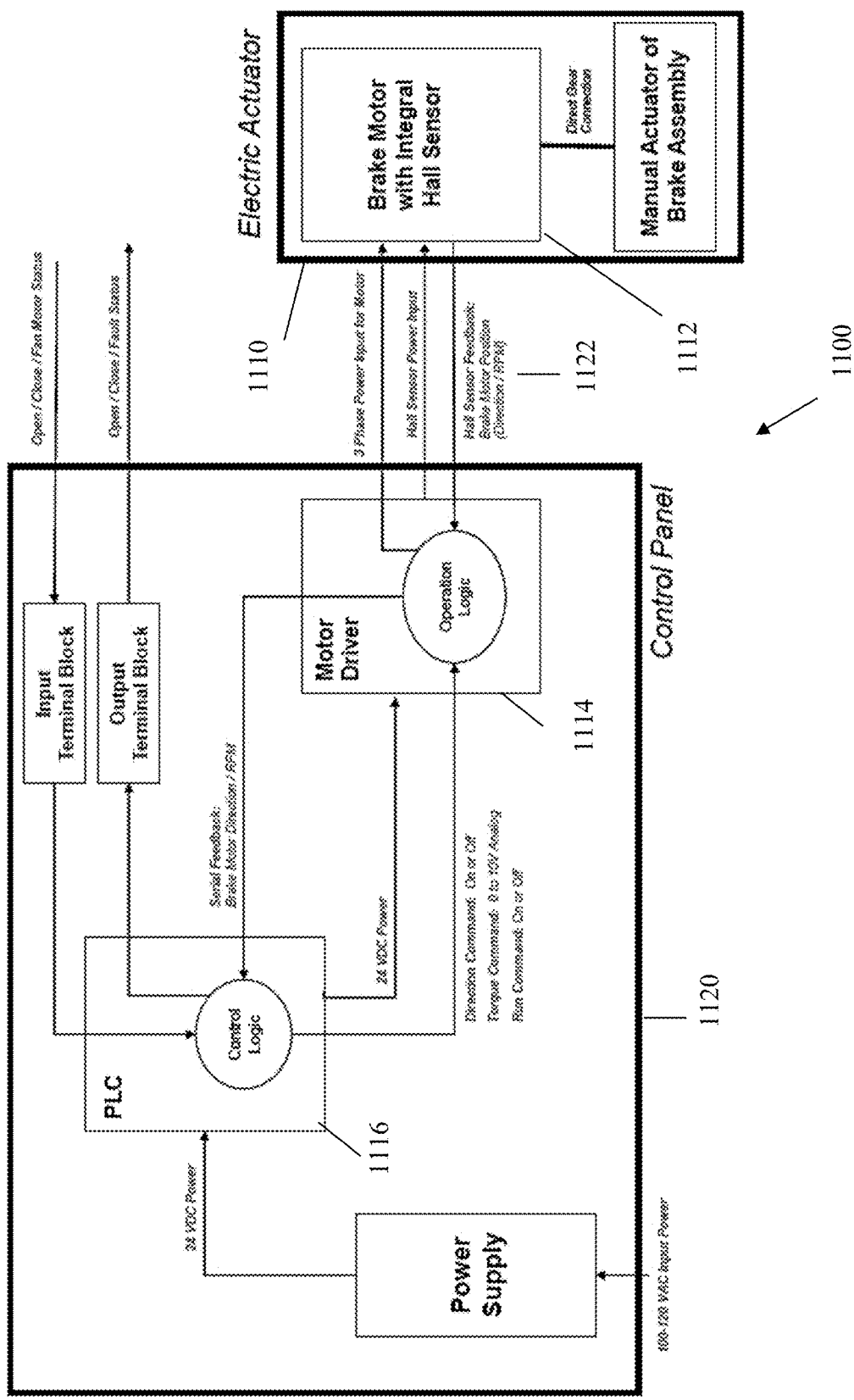
FIG. 11 illustrates a schematic diagram of one embodiment of a fan brake control system of the present disclosure.
Figure 12:
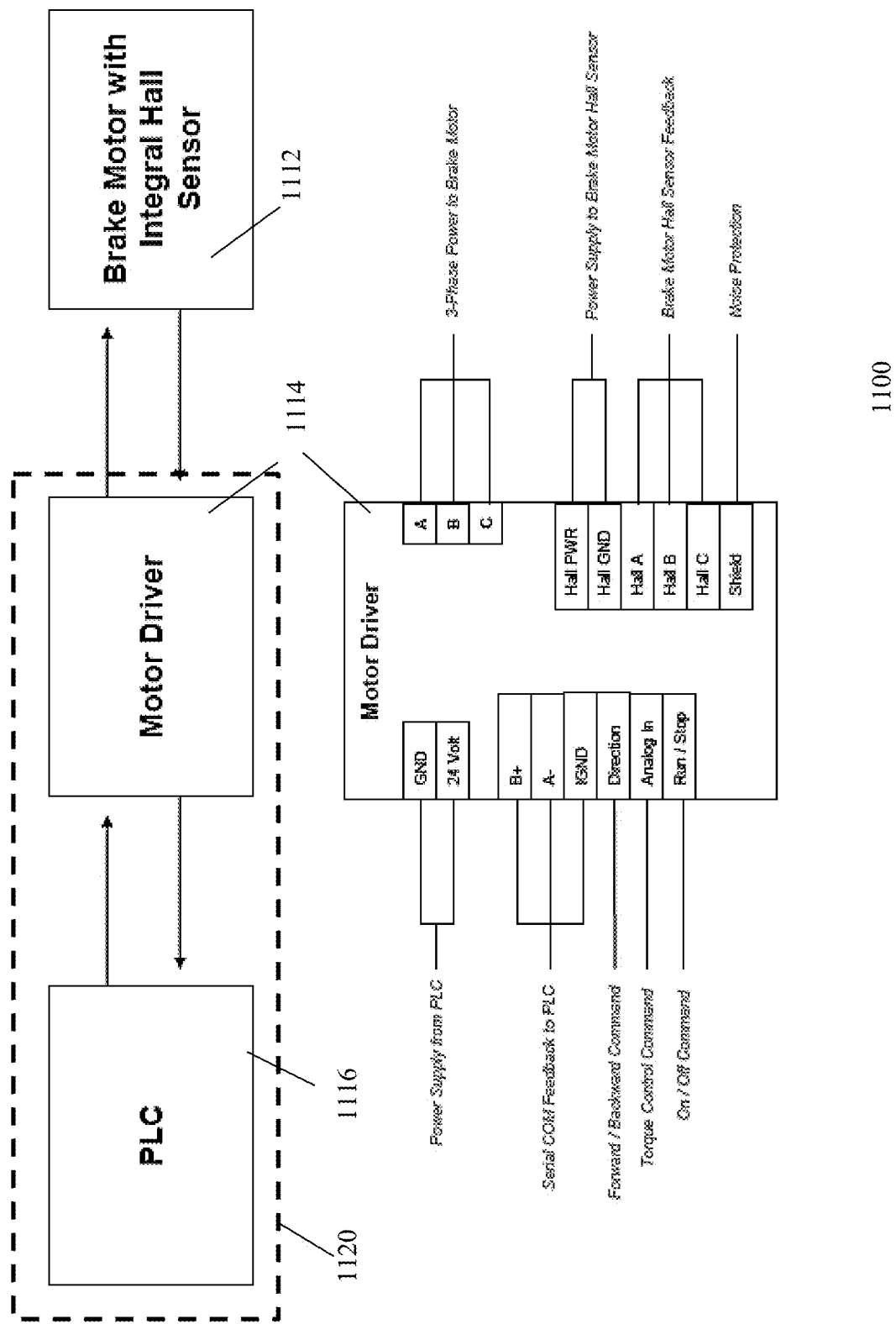
FIG. 12 illustrates a schematic view of motor driver of the control system of FIG. 11.

As shown in FIGS. 11-12, another aspect of the present disclosure is a fan brake system 1100 for controlling an industrial fan system, the fan brake system 1100 including a fan brake having a brake pad movable on the fan brake to selectively engage the fan system. An actuator 1110 including a motor 1112 can be operable to cause the fan brake to perform a braking procedure on the fan system to resist rotational movement of the fan system. A controller 1120 can be communicated with the actuator, the controller 1120 operable to selectively cause the actuator 1110 and the fan brake to perform the braking procedure, wherein the controller 1120 is operable to monitor and control power being supplied to the motor 1112 of the actuator during the braking procedure to maintain a torque output of the motor 1112 according to a predetermined torque profile during the braking procedure. Operating the motor 1112 of the actuator 1110 based on a predetermined torque profile can allow the performance of the motor 1112 to be driven and controlled by its output torque, and thus the torque applied to the fan system, which can help prevent damage to the fan system or the fan brake during the braking procedure, and particularly for larger fan systems operating at high speeds.

In some embodiments, the actuator motor 1112 can include a motor driver 1114, and the controller 1120 includes the motor driver 1114 and a programmable logic controller (PLC) 1116 in communication with one another. The operations and control functions discussed hereinafter can be performed by one or more of the motor driver 1114 or the PLC 1116. The controller 1120 can be operable to vary the current supplied to the motor to control power and the torque output of the motor during the braking procedure in response to different feedbacks provided to the controller 1120 from the fan brake system and or the fan system.

Figure 17:
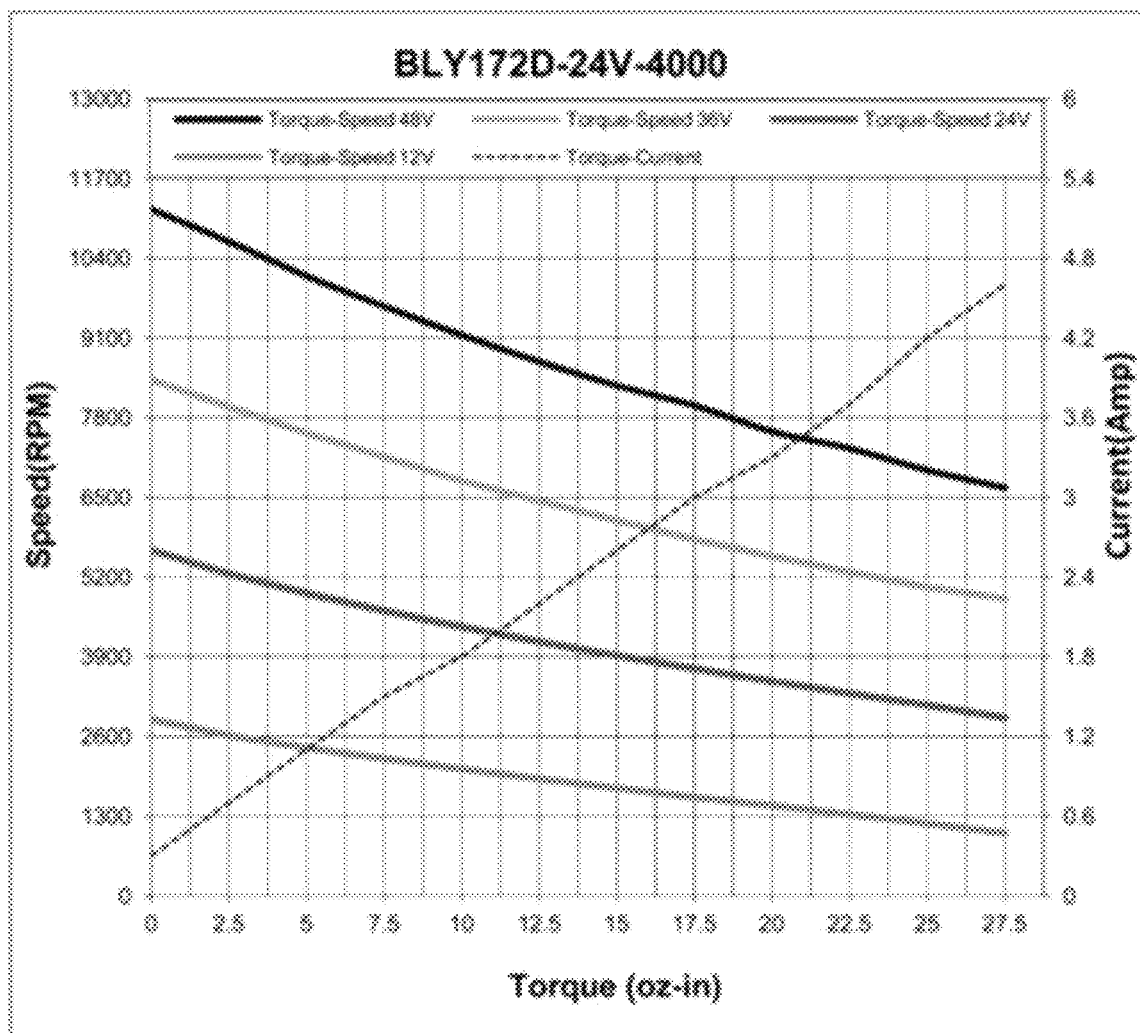
FIG. 17 illustrates a plot of speed and current versus torque at varying voltages for an exemplary motor of a fan brake system of the present disclosure.

Torque for a motor can be generally calculated as the power of the motor divided by the speed (RPM) of the motor (multiplied by a coefficient factor). As such, if the power provided to the actuator motor 1112 remains constant, and the speed or velocity of the motor decreases, then an increase in the torque of the motor will be seen. For instance, when a load such as the engagement with the fan system is applied to the actuator motor 1112, the load can bog down the motor 1112 causing it to slow down. If the power is maintained a spike in torque can be experienced which can cause a shock load to the fan system or the actuator motor 1112. In response to the decrease in speed during engagement of the fan brake with the fan system, and during, the controller can back off power to maintain the torque at a safe level. FIG. 17 shows plots of speed and current in an actuator motor versus different torque levels and at varying voltages to demonstrate these relationships. Between power, speed, and torque.

In some embodiments, the fan brake system can also include a speed sensor 1122 communicated with the controller 1120, the controller 1120 operable to determine and monitor a rotational speed of the actuator motor 1112 or the actuator shaft coupled to the motor 1112 based on information received from the speed sensor. By monitoring both the power and the speed of the motor in real time, the controller 1120 can monitor the torque applied by the actuator motor 1112 to the fan system and adjust power accordingly to maintain the torque applied by the motor 1112 at a safe level. The speed sensor 1122 in some embodiments can measure the speed of the motor 1112, and more specifically the rotational speed of the actuator shaft of the motor 1112, directly. In other embodiments, the speed sensor 1122 may be operable to measure a change in position of the actuator shaft, for instance with a hall effect sensor operable to detect an angular displacement distance travelled by the actuator shaft, and provide such positional data to the controller 1120 with corresponding time stamps. The controller 1120 can then use the time stamps to determine a speed or velocity of the motor 1122. In some embodiments, the controller 1120 can be programmed to determine and monitor in real time the torque output of the motor based on the determined rotational speed of the motor 1112 and the power supplied to the motor 1112.

In other embodiments, the predetermined torque profile can include maintaining a torque output of the motor 1112 at or below a predetermined torque limit during the braking procedure, and the controller 1120 is programmed to monitor and control power being supplied to the motor 1112 of the actuator to maintain the rotational speed of the motor 1112 at or below a predetermined speed limit during the braking procedure. As such, both the rotational speed and the torque of the motor 1112 can be limited to help optimize speed and torque of the motor during the braking procedure. As such, the braking procedure can occur as quickly as possible within safe limits.

In some embodiments, a torque limit and a rotational velocity limit can be set at the controller 1120 level for a particular braking procedure or operation. In some embodiments, the motor rotational speed limit can be inherently programmed into the motor by the manufacturer. These safety parameters can be tailored for the mechanics and particular operational parameters for the actuator motor 1112 and or the fan system. For instance, for larger fans that can withstand a larger braking force, the torque limit can be increased, and for larger actuator motors 1112 that can run safely at higher speeds, the rotational speed limit can be increased. In order to provide optimized and safe braking, a different limit can govern the movement of the brake motor at different times during braking.

The safe braking limit can be changed with a single numeric input when the PLC software is loaded on each unit. This allows for the system to adapt to nearly any application with just a few key strokes. During braking events, if the brake motor encounters a situation where additional torque is required to continue moving forward, the brake motor torque will be increased by the PLC 1116 until it reaches the safe limit. If this causes the actuator motor 1112 to cease movement, this means that either the brake has closed at a hard stop, or that the brake has encountered an issue (i.e. a physical obstruction) that would require unsafe torque levels to overcome. In some embodiments, torque and rotational speed can be monitored by the PLC 1116. The PLC 116 can provide a control electrical signal to the motor driver 1114. The electrical signal can be proportional to the current that is desired to be applied by the motor driver 114 to the motor 1112 to achieve a desired torque or rotational speed. The electrical signal from the PLC 1116 in some embodiments can be varied by the 0 10 volt analog input into the motor driver 1114 to control the power supplied to the motor 1112. The PLC receives various feedback, such as power and speed information from the motor driver 114 and varies this electrical command as necessary. What is being actually varied is the current supplied to the brake motor itself from the motor driver 1114 in response to feedback received from the motor driver 1114. This can be a closed loop feedback control in real time.

Figure 16:
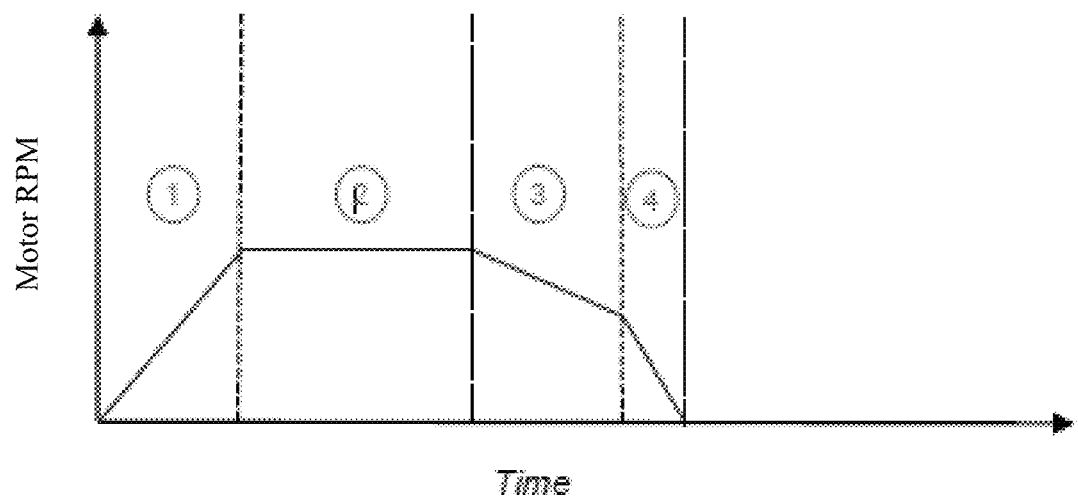
FIG. 16 illustrates a time graph of motor speed for one embodiment for a typical braking profile.

A rotational speed graph over time for an exemplary braking procedure is shown in FIG. 16. In an initial ramp up period (1), the brake motor would have just started moving. Torque would be high for a very brief movement to overcome static friction and initiate movement. Then the movement of the brake motor is governed by the RPM limit in area (2) of the graph once maximum speeds are reached as little torque is required to continue to increase RPM until the brake pad engages the fan system. During time frame (2), the brake motor is moving the brake pad toward the brake disc as quickly as possible, but at a steady rate. Running the motor at max speed can help optimize braking by minimizing braking time when little resistance is applied to the motor 1112.

Once the brake pad makes contact with brake disc in time period (3), a mechanical resistance manifests in the motor that takes additional torque to overcome. The brake motor is now governed by the torque limit, not the speed limit. The motor speed decreases due to the mechanical resistance of the fan system as more of the total power is allocated for torque demands as opposed to speed demands. The system will now increase torque up to the safe limit.

The brake motor 1112 will operate at maximum torque until the brake pad reaches a fully closed position, i.e. until zero RPM's are detected. The brake motor 1112 will eventually drive the brake pad into a hard stop signified at the end of time period (4) where speed reaches zero. At this point the brake is closed. If this is achieved and the desired braking distance has been satisfied them the system will know that the brake is in the proper closed position.

Referring now to FIG. 15, in some embodiments, the predetermined torque profile can include maintaining the torque of the motor at or below a first predetermined torque limit during a first portion 1590 of the braking procedure as the brake pad 1352 travels through a first portion 1590 of the target closing displacement distance 1596, and maintaining the torque of the motor at or below a second predetermined torque limit during a second portion 1592 of the braking procedure as the brake pad travels through a second portion 1594 of the target closing displacement distance 1596. Wherein the first predetermined torque limit is greater than the second predetermined torque limit. Such a torque profile can allow the motor to provide a decreasing amount of torque as the fan slows to a stop to help prevent over tightening, jamming, or sticking after performing the braking procedure, which can make it more difficult to return the brake pad to an open position when desired. In some embodiments, second predetermined closing torque limit can be roughly ⅔ of the first predetermined closing torque limit.

In some embodiments, the controller is operable to selectively cause the fan brake to perform an opening procedure by: reversing the direction of the motor to cause the brake pad to move from the closed position to the open position by travelling a target opening displacement distance 1584 equal to the target closing displacement distance 1584; maintaining the torque of the motor at or below a first predetermined opening torque limit during a first portion of the opening procedure as the brake pad travels through a first portion 1586 of the target opening displacement distance 1584, and maintaining the torque of the motor at or below a second predetermined opening torque limit during a second portion of the opening procedure as the brake pad 1352 travels through a second portion 1588 of the target opening displacement distance 1584. The second predetermined opening torque limit can be less than the first predetermined torque limit. As such, as the brake pad 1352 approaches the open position shown in FIG. 15, the torque can be reduced to similarly help prevent over tightening, jamming, or sticking of the brake pad 1352 in the open position after performing the opening procedure.

In some embodiments, during the braking procedure the fan brake moves from an open position toward a desired closed position. The controller 1120 can be programmed to detect that the fan brake is in the closed position when the controller 1120 identifies that the motor reaches a predetermined torque limit and the rotational speed of the motor 1112 is maintained at zero for a predetermined closure confirmation time. For instance, the controller in some embodiments can be programmed to detect that the fan brake is in the closed position after the controller detects that the speed of the motor is substantially zero for a period of 2, 2.5, 3.5, 4, 4.5, 5, 5.5, 10, 20, or 30 seconds, or any other time period suitable to the user.

In some embodiments, the controller 1120 can be operable to determine a target closing displacement distance 1596 of the actuator shaft of the motor 1112 for the braking procedure, as described hereinafter, and the controller can be programmed to identify a default in the fan brake when the controller 1112 detects during the braking procedure that the predetermined torque limit is reached and the rotational speed of the motor 1112 is maintained at zero for the predetermined closure confirmation time, but the actuator shaft has not travelled through a satisfactory percentage of the target closing displacement distance 1596. For instance, in some embodiments, the controller 1120 can be detect a default if the brake is considered to be closed but the brake has not travelled through at least 80, 85, 90, or 95 percent (or any value there between) of the target closing displacement distance 1596 associated with the braking procedure. Such a default can occur when there is an obstruction in the path of the brake pad such that the motor is stopped due to torque limits prior to the brake pad reaching a full closed position. However, having some leeway in the travel distance below 100 percent of the target closing or opening displacement distances so long as the speed of the motor is maintained at zero for a suitable time can help prevent false positive defaults where a suitable closing or opening position is obtained.

In some embodiments, travel distances during an opening or a braking procedure above 100 percent of the target opening and closing displacement distances are not limited or prevented by the controller 1120, though the total travel distance for the fan brake pad can be governed by the torque limit being reached and the motor speed slowing to zero for a suitable period of time to detect a closed state for the fan brake. Allowing travel distances greater than the target opening and closing travel distances can allow for brake pad wear where travel distances may need to gradually exceed the target travel distances to obtain an adequate closing force.

In some embodiments, the controller 1120 can be programmed to identify a default in the fan brake when the controller detects that the actuator shaft has not travelled a predetermined percentage of the target closing displacement distance 1596 associated with the braking procedure during a predetermined initial time period for the braking procedure. For instance, the controller 1120 can be programmed to identify a default in the fan brake when the controller 1120 detects that the actuator shaft has not travelled at least 5, 10, 15, 20, or 25 percent of the target closing displacement distance 1596 (or any percentage there between) associated with the braking procedure the first 10, 15, 20, 25, 30, 35, 40, 45, 50, 55, or 60 seconds (or any time period there between) of the braking procedure. Such a default can occur when there is a misalignment in the fan brake system such that the motor does not stop but is slowed significantly, which can cause damage or increased wear on the motor and/or the fan brake system. Such a default can also occur when the brake motor has failed, a close command is sent, and no motion is detected during the initial period, indicating damage to the motor. In other embodiments, a default can be triggered if the target closing displacement distance is not achieved after a period of 5, 6, 7, 8, 9, or 10 minutes, which can indicated a blockage or misalignment later in the path of the brake pad.

As noted previously herein, in some embodiments, the controller 1112 can is operable to monitor an operational status of the fan system during the braking procedure, and prevent or reverse the braking procedure and move the brake pad to the open position if the controller 112 determines that the fan system is operational or the motor for the fan system is on. Applying a brake force while the fan is running could cause wear or damage to the fan system or the fan brake system.

In some embodiments, the brake actuator is being driven by an electric motor. There is a physical linkage between the actuation of the electric motor and the movement of the brake pad onto the fan system. The torque output or drive force of the actuator can be directly related to the power being supplied to the motor, or the voltage supplied to the motor times the current applied to the motor. The torque output of the electric motor can also be directly proportional to the torque output applied on the fan system by the brake pad coupled to the electric motor. A safe braking torque can be known or determined for a particular fan system, which can be less than a braking torque that would create a failure in the fan system or the actuator motor. A safe motor torque output or safe power output from the motor can then be determined from the safe braking torque. The controller 1120 such as a PLC 1116 can then regulate the torque output of the motor by monitoring the current draw in the motor and varying the current and/or voltage supplied to the motor to maintain the torque output or power output of the motor at a desired level, thus maintaining a safe torque output applied to the fan system during the braking of the fan system by the fan brake system. The controller can thus send a signal to the motor driver to create a voltage at the motor commutator that drives a specific current through the commutator. This current and voltage combination relates to specific torque output for the electric motor (this is a trait that's true of all electric motors). Therefore, by regulating the electrical commands to the electric motor in response to a detected current supplied to the motor, the braking torque applied to the motor and thus the fan system can be regulated and controlled.

Controlling the fan brake system based on a desired power to be supplied by the actuator motor can provide significant advantages. For instance, when a brake pad of the fan brake system encounters the drive shaft or another component of the fan system during a braking operation, the electric motor will experience an increase in the load applied on the motor, which in an unregulated system would cause the current draw by the motor from a power source to increase in order to accommodate the increased load. The increase in the current draw by the motor can produce excess wear on the electric motor of the fan braking system, and can also increase the power output of the motor, and thus the torque applied on the fan system, beyond a safe limit, potentially causing damage to the fan system and injury to persons or property in the event of a fan system failure.

The controller in certain embodiments can monitor the current draw from the electric motor of the actuator, and when the controller detects a spike in the current due to an increase in the load when the brake pad engages the fan system, the controller can reduce the current supplied to the actuator motor to maintain the output power and torque of the electric motor at a desired level. Also advantageously, as the fan system begins to slow during the braking process, thus reducing the load on the motor, the controller can gradually increase the current supplied to the motor to maintain the power output and further advance the brake pad of the fan brake system toward the fan system such that the fan system can be slowed and stopped as quickly as possible while maintaining the safety of the braking system. Similarly, as the brake pad is approaching the fan system and no load is present on the fan brake system, such that the current draw is low, the controller can send a higher voltage signal to the electric motor to maintain a safe and desired power output of the motor such that the brake pad can move toward the fan system as fast as possible while maintaining the safety of the fan brake system.

Thus, regulation of the braking torque on the fan system by regulating the power output of the actuator motor can be performed in real time without measurement of any variables other than the voltage and current being supplied to the fan brake motor and without having to define a custom brake profile for each application or fan system.

Adjustment of Initialization Process for Brake Position Error Sensing

When the brake is initialized, it looks to find its closed position and its open position. These positions are "hard stops" and found when current spikes are produced in the electric motor that is moving the brake due to the fact that the brake pad cannot travel any further in one direction or the other. This allows the brake to know where close is and where open is for that particular brake and/or fan system setup.

The brake system position sensor and controller can also measure the travelled distance between open and closed positions during initialization so that it has an expectation of how far the brake pad should travel when it is called to close for each particular system. If it does not travel this expected distance, then there may be a blockage. This creates a brake position error fault. This is an important fault to let the facility know there may be an issue and the brake may not have closed. Similarly in an opening procedure, if the brake pad doesn't travel the target opening displacement distance, the user may think the fan brake is in an open position when it isn't, which can be problematic, particularly if the fan system is turned on based on the assumption that the fan brake is open.

In some embodiments, the fan brake system includes a position sensor such as a hall effect sensor or any other suitable sensor which can be operable to monitor the position of the brake pad when the fan brake system is placed adjacent to the fan system, and the controller 1112 can be selectively operable to perform an initialization procedure including the steps of: causing via the actuator the brake pad to move away from the fan system until the motor 1112 reaches a predetermined opening torque limit which indicates the fan brake pad is in a desired open position; causing via the actuator the brake pad to move toward and engage the fan system until a predetermined closing torque limit is reached which indicates the brake pad is in a desired closed position; calculating via the position sensor a target closing displacement distance travelled by the brake pad between the open position and the closed position; and returning the brake pad to the open position for the braking procedure. As the controller subsequently causes the actuator to perform the braking procedure, during the braking procedure, the position system can monitor whether the brake pad has travelled the calculated target closing displacement distance.

The first opening step can be performed at max torque to overcome any over torqueing of the fan brake via manual adjustment or other system issues or miscalibrations that caused the fan brake to be over torqued. The open position is reached during this initial step when a max torque limit is reached and the motor is at zero RPMS for a suitable time period (e.g. 2.5 seconds).

During the closing step, the motor can be governed by the same logic applied during a normal braking operation. The motor can close the brake as governed by the speed and torque limits previously discussed until a maximum torque is reached and the motor is at zero RPMs for a suitable time period (e.g. 2.5 seconds). By mimicking a normal braking operation during the initialization step, the braking operation during initialization, and thus the calculated target closing displacement distance, can be an accurate representation of normal operating conditions that are to be replicated during operation of the fan brake system. Once the brake returns to the open position, the brake is operational and can await braking instructions from the controller.

In a scenario where the brake has been over torqued and it is called to initialize, the brake attempts to go to a closed position and immediately sees a hard stop. It then reverses to open and hits a hard stop. It has then completed initialization and has measured the distance between the two hard stops. Then it is called to close in normal operation. The closing torque is far less than what was manually applied before initialization, so the brake does not travel the distance measured during initialization. This creates a brake position fault because the brake has traveled less than it did during initialization. Applying an open-close-open initialization process can help overcome this problem scenario. Using the same torque governance to aid in this initialization step. Upon initialization, the brake pad can be moved to an open position until a hard stop is reached. The fan brake system can then move to a closed position and hit a hard stop once the brake pad is in a position such that any further movement would require a torque output from the motor beyond a threshold limit. This hard stop established the desired closing displacement travel distance for the brake during normal operating conditions. The brake pad can then be moved to an open position and the distance between the torque governed closed position and the open position can be measured, thus establishing the desired travel distance during normal operations and removing any manual over torqueing from the distance fault determination during normal use of the fan brake system.

Having an initialization step that calibrates target closing distances based on maximum torque values during an initialization step can help account for installation or application errors when the fan brake is installed to operate in conjunction with a fan system. If the fan brake is set up in an improper orientation or location, by performing the initialization procedure disclosed herein, an appropriate target closing distance can be calibrated for each unique fan brake setup. Having a preset travel distance cannot account for these operational errors.

Algorithm for Checking Health of Fan Motor Sensor

In embodiments including a fan motor sensor that can detect when a fan motor is running or not, it is desirable to ensure that the fan motor sensor is operating properly. This sensor detects the status of the large fan motor. In order for the brake to be applied, the fan motor needs to be off. If this sensor has failed, it will not allow the brake system to function properly, as the sensor may indicate that the fan is off when in fact the fan is running. Applying the fan brake system when the fan is running can cause damage to the fan brake system and the fan system and is generally undesirable.

The RPM sensor discussed and described herein can be utilized to detect movement in the fan system, but movement could be due to wind and not the large fan motor. Movement due to wind will be variable as wind speeds change, whereas fan speeds when driven by a motor will be substantially constant or steady state. In some embodiments, the controller or PLC can be programmed to read the RPM's detected by the RPM sensor and determine a moving average of the fan speeds over a specific amount of time. In some embodiments, the controller can determine average fan speeds in 5-20 second intervals, or any other suitable interval, with a sample being taken every half second. The controller can be programmed to determine based on these average speed calculations when the fan motor has placed the fan system in steady state, for instance when 3 subsequent determined speed averages vary by less than 2.5 percent. One of skill in the art will recognize that various thresholds for the determining that the fan is in a steady state can be employed in the controller that are within the scope of the present disclosure. The idea being that the wind may induce fan speeds close to operating speeds, but it is highly unlikely (if not impossible) for the wind to maintain fan speeds within a very narrow range like the fan motor will during normal operation. Calculating the average fan speed and looking for a threshold deviation also allows the controller to detect the health of the fan motor sensor for various fan motors operating at different speeds or RPMs, because the controller is not monitoring for a specific RPM, just instead steady state operating conditions.

Once steady state has been detected, the controller determines that the fan system is in motion and its motion is too consistent to be the wind. If the fan motor sensor is not detecting that the fan motor is running while the controller determines that the fan is at steady state, then the controller can identify that the fan motor sensor has an error. This solution will also work for fans that have VFD's as long as they do not alter their operating speeds on a minute to minute basis, which would be highly unlikely. Therefore, we can detect fan motor sensor health through this algorithm on fan systems of varying operating speeds.

Manual Adjustment Fault

The manual actuator is maintained so personnel can adjust the brake position manually. It is desirable to be able to detect when the brake has been manually adjusted, so that an incorrect brake status or position is not reported to the control room or the controller. It is also desirable to detect manual adjustment of the fan brake so that the brake cannot be disengaged from its closed position without detection of a fault.

An experiment to determine how much the brake could be manually adjusted before it was opened from a closed position was conducted. The brake was closed with the consistent and regulated braking torque method described herein. The brake force was then incrementally adjusted or backed off manually, loosening the braking force. While this was being done, a movement distance of the actuator motor was measured through the encoder on the electric motor. Using this method, a safe distance was determined with respect to how much the brake could be adjusted or backed off while still maintaining a sufficient locking or isolation force to prevent movement of the fan. We defined this in terms of encoder counts and then translated this into a percentage of expected travel distance. In one embodiment, if the system detects that the brake has moved more than 10% of expected travel distance found during initialization then the manual adjustment fault will trigger, indicating that the brake has been manually adjusted to an unsafe condition. In some embodiments, these threshold fault conditions can vary, for instance given the length of the expected travel distance. For embodiments where the expected travel distance may be relatively longer, or for larger or heavier fans, or for a more conservative safety regime, the percentage of travel distance achieved before a fault condition is achieved may need to be reduced.

It is understood that while the system and method disclosed herein may work for application of the control system to a manual fan brake, the techniques described herein can be applied to other brakes or lock out devices that are operated mechanically, electrically, pneumatically, or with hydraulics. Additionally, while one embodiment of a manual fan brake is shown and described herein which applies a transverse force via brake pads on one or more lateral side of a rotor, in other embodiments the brake pads can be oriented to provide a radial or tangential force against the rotor.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in manufacturing, which in one embodiment is ±6.35 millimeters (±0.25 inches). To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A fan brake system for controlling an industrial fan system, the fan brake system comprising:
    a fan brake including a brake pad movable on the fan brake to selectively engage the fan system;
    an actuator including a motor operable to cause the fan brake to perform a braking procedure on the fan system to resist rotational movement of the fan system; and
    a controller communicated with the actuator, the controller operable to selectively cause the actuator and the fan brake to perform the braking procedure, wherein the controller is operable to monitor and control power being supplied to the motor of the actuator during the braking procedure, as well as the rotational speed of the motor;
    a position sensor communicated with the controller, the position sensor operable to detect movement of the brake pad during the braking procedure;
    wherein the controller is operable to stop the braking procedure once the position sensor detects that the brake pad has travelled at least a target closing displacement distance and the rotational speed of the motor is zero.

2. The fan brake system of claim 1, wherein the controller is operable to vary the current supplied to the motor to control power and the torque output of the motor during the braking procedure according to a predetermined braking procedure.

3. The fan brake system of claim 1, wherein the fan brake system includes a speed sensor communicated with the controller, the controller operable to determine and monitor the rotational speed of the motor based on information received from the speed sensor.

4. The fan brake system of claim 3, wherein the controller is programmed to determine and monitor in real time the torque output of the motor based on the determined rotational speed of the motor and the power supplied to the motor.

5. The fan brake system of claim 3, wherein the predetermined torque profile includes maintaining a torque output of the motor at or below a predetermined torque limit during the braking procedure, and the controller is programmed to monitor and control power being supplied to the motor of the actuator to maintain the rotational speed of the motor at or below a predetermined speed limit during the braking procedure.

6. The fan brake system of claim 3, wherein the motor includes an actuator shaft and the speed sensor is a hall effect sensor operable to detect an angular displacement distance travelled by the actuator shaft, wherein the controller can determine and monitor the rotational speed of the motor by observing the angular displacement distance travelled by the actuator shaft in a successive time periods.

7. The fan brake system of claim 1, wherein the controller is operable to maintain a torque output of the motor according to a predetermined torque profile during the braking procedure, and the predetermined torque profile includes:
    maintaining the torque of the motor at or below a first predetermined torque limit during a first portion of the braking procedure, and
    maintaining the torque of the motor at or below a second predetermined torque limit during a second portion of the braking procedure.

8. The fan brake system of claim 7, wherein the first predetermined torque limit is greater than the second predetermined torque limit.

9. The fan brake system of claim 1, wherein during the braking procedure:
the fan brake moves from an open position to a closed position; and
the controller operable to monitor the torque output of the motor and the controller is programmed to detect that the fan brake is in the closed position when the controller identifies that the motor reaches a predetermined torque limit and the rotational speed of the motor is maintained at zero for a predetermined closure confirmation time.

10. The fan brake system of claim 9, wherein:
the controller is programmed to identify a default in the fan brake when the controller detects during the braking procedure that the predetermined torque limit is reached and the rotational speed of the motor is maintained at zero for the predetermined closure confirmation time, but the brake pad has not travelled at least the target closing displacement distance.

11. The fan brake system of claim 1, wherein:
the controller is operable to determine a target closing displacement distance of the actuator shaft of the motor during the braking procedure; and
the controller is programmed to identify a default in the fan brake when the controller detects that the actuator shaft has not travelled at least ten percent of the target closing displacement distance associated with the braking procedure during a predetermined initial time period for the braking procedure.

12. The fan brake system of claim 1, wherein the controller is operable to monitor an operational status of the fan system during the braking procedure, and prevent or reverse the braking procedure if the controller determines that the fan system is operational.

13. The fan brake system of claim 1, wherein:
the controller is selectively operable to perform an initialization procedure including the steps of:
causing via the actuator the brake pad to move away from the fan system until the motor reaches a predetermined opening torque limit which indicates the fan brake pad is in a desired open position;
causing via the actuator the brake pad to move toward and engage the fan system until a predetermined closing torque limit is reached which indicates the brake pad is in a desired closed position;
calculating via the position sensor a target closing displacement distance travelled by the brake pad between the open position and the closed position; and
returning the brake pad to the open position for the braking procedure.

14. The fan brake system of claim 13, wherein during the braking procedure, the position system monitors whether the brake pad has travelled the target closing displacement distance from the open position.

15. The fan brake system of claim 1, wherein the motor includes a motor driver, and the controller includes the motor driver and a programmable logic controller in communication with one another.

16. A fan brake system for controlling an industrial fan system, the fan brake system comprising:
a fan brake including a brake pad movable on the fan brake to selectively engage the fan system;
an actuator including a motor operable to cause the fan brake to perform a braking procedure on the fan system to resist rotational movement of the fan system, the motor including an actuator shaft;
a speed sensor operable to detect information related to a rotational speed of the motor;
a position sensor operable to monitor the position of the brake pad when the fan brake system is placed adjacent to the fan system; and
a controller communicated with the actuator, the position sensor, and the speed sensor, the controller operable to selectively cause the actuator and the fan brake to perform the braking procedure, wherein:
the controller is operable to determine and monitor the rotational speed of the motor of the actuator based on information received from the speed sensor;
the controller is operable to monitor and control power being supplied to the motor of the actuator and the rotational speed of the motor in real time during the braking procedure, and the controller is operable to stop the braking procedure once the position sensor detects that the brake pad has travelled at least a target closing displacement distance and the rotational speed of the motor is zero.

17. A fan brake system for controlling an industrial fan system, the fan brake system comprising:
a fan brake including a brake pad movable on the fan brake to selectively engage the fan system;
an actuator including a motor operable to cause the fan brake to perform a braking procedure on the fan system to resist rotational movement of the fan system;
a position sensor operable to monitor the position of the brake pad when the fan brake system is placed adjacent to the fan system; and
a controller communicated with the actuator and the position sensor, the controller operable to selectively cause the actuator and the fan brake to perform the braking procedure and monitor the rotational speed of the motor of the actuator, wherein:
the controller is selectively operable to perform an initialization procedure including the steps of:
causing via the actuator the brake pad to move away from the fan system until the motor reaches a predetermined opening torque limit which indicates the fan brake pad is in a desired open position;
causing via the actuator the brake pad to move toward and engage the fan system until a predetermined closing torque limit is reached which indicates the brake pad is in a desired closed position;
calculating via the position sensor a target closing displacement distance travelled by the brake pad between the open position and the closed position; and
returning the brake pad to the open position for the braking procedure; and
the controller is operable to monitor and control power being supplied to the motor of the actuator during the braking procedure, and the controller is operable to stop the braking procedure once the position sensor detects that the brake pad has travelled at least a target closing displacement distance and the rotational speed of the motor is zero.

18. The fan brake system of claim 17, wherein the controller is operable to maintain a torque output of the motor according to a predetermined torque profile during the braking procedure, and the predetermined torque profile includes:
maintaining the torque of the motor at or below a first predetermined closing torque limit during a first portion of the braking procedure as the brake pad travels through a first portion of the target closing displacement distance, and maintaining the torque of the motor at or below a second predetermined closing torque limit during a second portion of the braking procedure as the brake pad travels through a second portion of the target closing displacement distance.

19. The fan brake system of claim 17, wherein:

the controller is operable to selectively cause the fan brake to perform an opening procedure by:

reversing the direction of the motor to cause the brake pad to move from the closed position to the open position by travelling a target opening displacement distance equal to the target closing displacement distance;

maintaining the torque of the motor at or below a first predetermined opening torque limit during a first portion of the opening procedure as the brake pad travels through a first portion of the target opening displacement distance, and maintaining the torque of the motor at or below a second predetermined opening torque limit during a second portion of the opening procedure as the brake pad travels through a second portion of the target opening displacement distance.

20. The fan system of claim 17, wherein:

the controller is operable to determine and monitor a rotational velocity of the motor using position information received from the position sensor;

the controller is programmed to identify a default in the fan brake when:

the controller detects during the braking procedure that the predetermined torque limit is reached and the rotational speed of the motor is maintained at zero for the predetermined closure confirmation time, but the actuator shaft has not travelled at least ninety percent of the target closing displacement distance associated with the braking procedure; or the controller detects that the actuator shaft has not travelled at least ten percent of the target closing displacement distance associated with the braking procedure during a predetermined initial time period for the braking procedure.

\* \* \* \* \*